U.S. Patent No.: US 12,165,254 B2
Date of Patent: *Dec. 10, 2024

(12) United States Patent
Wei et al.

(54) METHOD AND APPARATUS FOR DISPLAYING VIRTUAL ENVIRONMENT PICTURE, DEVICE, AND STORAGE MEDIUM

(71) Applicant: Tencent Technology (Shenzhen) Company Limited, Shenzhen (CN)

(72) Inventors: Jiacheng Wei, Shenzhen (CN); Xun Hu, Shenzhen (CN); Kang Zhang, Shenzhen (CN); Xiangyu Zhang, Shenzhen (CN); Shandong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,955

(22) Filed: Nov. 8, 2023

(65) Prior Publication Data
US 2024/0070974 A1 Feb. 29, 2024

Related U.S. Application Data

(63) Continuation of application No. 17/511,394, filed on Oct. 26, 2021, now Pat. No. 11,847,734, which is a
(Continued)

(30) Foreign Application Priority Data

Apr. 9, 2020 (CN) .......................... 202010275730.8

(51) Int. Cl.
G06T 15/20 (2011.01)
A63F 13/525 (2014.01)
G06T 7/70 (2017.01)

(52) U.S. Cl.
CPC ............ *G06T 15/20* (2013.01); *A63F 13/525* (2014.09); *G06T 7/70* (2017.01); *G06T 2207/30244* (2013.01)

(58) Field of Classification Search
CPC . G06T 15/20; G06T 7/70; G06T 2207/30244; A63F 13/525; A63F 13/35;
(Continued)

(56) References Cited

U.S. PATENT DOCUMENTS 11,185,773 B2 * 11/2021 Huang .................. A63F 13/537
11,675,488 B2 *  6/2023 Qiu ........................ G06F 3/0488
                                                                345/173
(Continued)

FOREIGN PATENT DOCUMENTS

CN       107168611 A    9/2017
CN       107754309 A    3/2018
(Continued)

OTHER PUBLICATIONS

Tencent Technology, Japanese Office Action, JP Patent Application No. 2021-564807, Nov. 13, 2023, 6 pgs.
(Continued)

*Primary Examiner* — Pierre E Elisca
(74) *Attorney, Agent, or Firm* — Morgan, Lewis & Bockius LLP

(57) ABSTRACT

This application discloses a method for operating virtual characters within a virtual environment performed by a computer device. The method includes: displaying a first virtual environment picture of a virtual environment by observing the virtual environment using a camera model at
(Continued)

a first observation position; in response to receiving an aiming operation associated with the main master virtual character, determining a target region in the virtual environment where the master virtual character aims for releasing a skill; and in accordance with a determination that at least a portion of the target region is not within the first region: moving the camera model from the first observation position to a second observation position by an offset manner; and displaying a second virtual environment picture by observing the virtual environment using the camera model at the second first observation position, the second virtual environment picture comprising a second region such that the target region is within the second region.

20 Claims, 13 Drawing Sheets

Related U.S. Application Data continuation of application No. PCT/CN2021/080258, filed on Mar. 11, 2021.

(58) Field of Classification Search
CPC .. A63F 13/426; A63F 13/5255; A63F 13/537; A63F 13/92; A63F 13/2145; A63F 13/57; A63F 13/56; A63F 2300/57; A63F 13/42; A63F 13/847; A63F 2300/807
USPC .......................................................... 463/31
See application file for complete search history.

(56) References Cited

U.S. PATENT DOCUMENTS

| | | | | |
|---|---|---|---|---|
| 2001/0024972 | A1* | 9/2001 | Kitao | .................. A63F 13/5258 463/33 |
| 2006/0040738 | A1* | 2/2006 | Okazaki | .................. A63F 13/45 463/32 |
| 2006/0061571 | A1 | 3/2006 | Nomura et al. | |
| 2012/0004017 | A1 | 1/2012 | Sakurai et al. | |
| 2012/0146992 | A1 | 6/2012 | Maeta et al. | |
| 2015/0157940 | A1* | 6/2015 | Hall | ..................... A63F 13/5372 463/31 |
| 2021/0016172 | A1* | 1/2021 | Huang | ..................... A63F 13/92 |
| 2021/0286446 | A1* | 9/2021 | Wang | ..................... A63F 13/87 |
| 2021/0322864 | A1 | 10/2021 | Shao et al. | |

FOREIGN PATENT DOCUMENTS

| | | |
|---|---|---|
| CN | 107913520 A | 4/2018 |
| CN | 109568957 A | 4/2019 |
| CN | 110292778 A | 10/2019 |
| CN | 110613933 A | 12/2019 |
| CN | 111481934 A | 8/2020 |
| JP | 2009157942 A | 7/2009 |
| JP | 2012128514 A | 7/2012 |
| WO | WO 2014142406 A1 | 9/2014 |
| WO | WO 2020024806 A1 | 2/2020 |

OTHER PUBLICATIONS

Trokiss-gamer.com, Strategy for Intermediate Players (Mobile Legends), 2019, Retrieved from the Internet: trokiss-gamer.com/mobile-legends/no-224/.

Nox app player, "Complete MOBA virtual key control (Mobile Legend, Pentastorm)", YouTube, Mar. 13, 2020, 2 pgs.

Tencent Technology, ISRWO, PCT/CN2021/080258, Jun. 21, 2021, 9 pgs.

Tencent Technology, IPRP, PCT/CN2021/080258, Oct. 6, 2022, 7 pgs.

Tencent Technology, Japanese Office Action, JP Patent Application No. 2021-564807, Dec. 23, 2022, 6 pgs.

Tencent Technology, Japanese Office Action, JP Patent Application No. 2021-564807, Jun. 19, 2023, 6 pgs.

Tencent Technology, Korean Office Action, KR Patent Application No. 10-2021-7034089, Aug. 24, 2023, 32 pgs.

Tencent Technology, Singapore Office Action, SG Patent Application No. 11202111549T, Apr. 4, 2023, 13 pgs.

* cited by examiner

METHOD AND APPARATUS FOR DISPLAYING VIRTUAL ENVIRONMENT PICTURE, DEVICE, AND STORAGE MEDIUM

CROSS-REFERENCE TO RELATED APPLICATIONS

This application is a continuation application of U.S. patent application Ser. No. 17/511,394, entitled "METHOD AND APPARATUS FOR DISPLAYING VIRTUAL ENVIRONMENT PICTURE, DEVICE, AND STORAGE MEDIUM" filed on Oct. 26, 2021, which is a continuation application of PCT Patent Application No. PCT/CN2021/080258, entitled "METHOD AND APPARATUS FOR DISPLAYING VIRTUAL ENVIRONMENT PICTURE, DEVICE, AND STORAGE MEDIUM" filed on Mar. 11, 2021, which claims priority to Chinese Patent Application No. 202010275730.8, filed with the State Intellectual Property Office of the People's Republic of China on Apr. 9, 2020, and entitled "METHOD AND APPARATUS FOR DISPLAYING VIRTUAL ENVIRONMENT PICTURE, DEVICE, AND STORAGE MEDIUM", all of which are incorporated herein by reference in their entirety.

FIELD OF THE TECHNOLOGY

This application relates to the field of man-machine interaction, and in particular, to a method and apparatus for displaying a virtual environment picture, a device, and a storage medium.

BACKGROUND OF THE DISCLOSURE

In an application based on a three-dimensional (3D) virtual environment, for example, a battle arena game, a master virtual character is bound to a camera model. When a user controls the master virtual character to move in the virtual environment, the camera model moves with the master virtual character, so that a picture of the master virtual character in the virtual environment is displayed.

The user can control the master virtual character to release a variety of regional skills in the virtual environment to attack another virtual character in the virtual environment. When releasing a regional skill, the master virtual character needs to select a region in which the skill is released, and the regional skill has an effect in the region. In a process of releasing the regional skill, a lens still follows the master virtual character, so that the master virtual character is always located in the center of a display screen of a terminal.

When the master virtual character releases regional skills, some regional skills may be beyond a display range of the display screen. As a result, a field of view of an aiming region is insufficient, and the user cannot see a target object in the aiming region and can only aim by feeling, which affects the judgment of the user.

SUMMARY

Embodiments of this application provide a method and apparatus for displaying a virtual environment picture, a device, and a storage medium, to select a target region by triggering a regional skill indicator through an aiming operation, thereby improving the accuracy of releasing a skill, and improving man-machine efficiency. The technical solutions are as follows.

According to one aspect of this application, a method for operating virtual characters within a virtual environment is performed by a computer device. The method includes:

displaying a first virtual environment picture of a virtual environment, the first virtual environment picture including a first region obtained by observing the virtual environment by using a first observation position as an observation center, the first virtual environment picture displaying a master virtual character located in the virtual environment;

displaying, in response to receiving an aiming operation associated with the main master virtual character, a regional skill indicator configured to select a target region in the virtual environment, the target region being a skill action region where the master virtual character releases a skill; and displaying a second virtual environment picture, the second virtual environment picture including a second region obtained by observing the virtual environment by using a second observation position as an observation center, the second observation position being a position that is offset relative to the first observation position, and the second region including the target region.

According to another aspect of this application, a computer device is provided for operating virtual characters within a virtual environment, the computer device comprising a processor and a memory, the memory storing at least one program, the program being loaded and executed by the processor to implement the method for operating virtual characters within a virtual environment picture described in the foregoing aspects.

According to another aspect of this application, a non-transitory computer-readable storage medium is provided. The storage medium stores at least one program, the at least one program being loaded and executed by a processor of a computer device to implement the method for operating virtual characters within a virtual environment picture described in the foregoing aspects.

The technical solutions provided in the embodiments of this application achieve at least the following beneficial effects:

A client receives an aiming operation, displays a regional skill indicator on a target region selected through the aiming operation, and adjusts an observation center of a virtual environment picture according to the selected target region, so that the virtual environment picture includes the whole target region, and the regional skill indicator can be completely displayed on the virtual environment picture, and can further accurately aim at an attack target, thereby reducing the time required by the aiming operation to accurately aim at the attack target, preventing the client from receiving too many invalid aiming operations, and further reducing additional calculations of the client in an aiming process, improving the running efficiency of the client, and improving the man-machine interaction efficiency.

DESCRIPTION OF EMBODIMENTS

Figure 1:
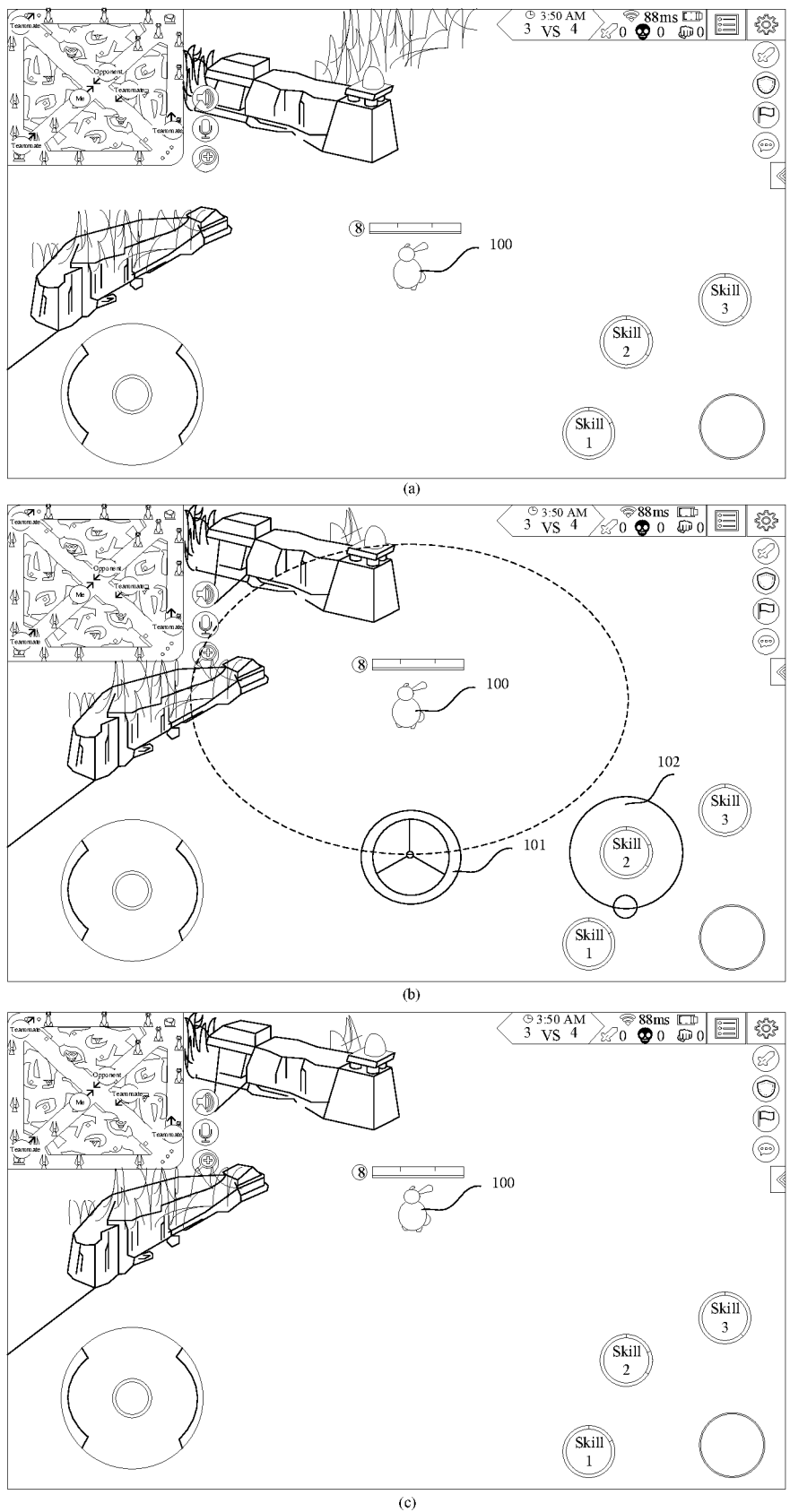
FIG. 1 is a schematic diagram of a virtual environment picture according to an exemplary embodiment of this application.

First, terms involved in the embodiments of this application are introduced:

A virtual environment is a virtual environment displayed (or provided) by an application when run on a terminal. The virtual environment may be a simulated environment of a real world, or may be a semi-simulated semi-fictional environment, or may be an entirely fictional environment. The virtual environment may be any one of a two-dimensional virtual environment, a 2.5-dimensional virtual environment, and a 3D virtual environment. This is not limited in this application. A description is made by using an example in which the virtual environment is a 3D virtual environment in the following embodiments. In some embodiments, the virtual environment is used for providing a combat environment for at least two master virtual characters. The virtual environment includes a lower left corner region and an upper right corner region that are symmetrical. Master virtual characters on two opposing sides occupy the regions respectively, and the objective of each side is to destroy a target building, a fort, a base, or a crystal deep in the opponent's region to win victory.

A virtual character is a movable object in a virtual environment. The movable object may be a virtual person, a virtual animal, a cartoon person, or the like, such as a character or an animal displayed in a 3D virtual environment. Optionally, the virtual character is a three-dimensional model created based on a skeletal animation technology. Each virtual character has its own shape and volume in the 3D virtual environment, and occupies some space in the 3D virtual environment. In the embodiments of this application, an example in which the virtual character is a master virtual character controlled by a user is used. The master virtual character generally refers to one or more master virtual characters in a virtual environment.

A camera model is a 3D model around a master virtual character in a virtual environment, which is used for automatically following the master virtual character in the virtual environment to obtain a virtual environment picture. A user sees the virtual environment picture by using the camera model, and the user cannot see the camera model. The virtual environment picture may be a picture obtained by observing in the virtual environment from a first-person perspective or a third-person perspective of the master virtual character.

A multiplayer online battle arena game (MOBA) is an arena game in which different virtual teams on at least two opposing camps occupy respective map regions in a virtual environment, and compete against each other using a specific victory condition as a goal. The victory condition includes, but is not limited to at least one of occupying a fort or destroying a fort of the opposing camp, killing virtual characters in the opposing camp, ensuring own survival in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 3 virtual characters, or 5 virtual characters. A duration of a round of the MOBA game is from a time point at which the game starts to a time point at which the victory condition is met.

The method provided in this application may be performed by a virtual reality (VR) application, a 3D map program, a military simulation program, a first-person shooting game (FPS), a MOBA game, or the like. An application during a game is used as an example for description in the following embodiments.

A game based on a virtual environment is formed by maps of one or more game worlds. The virtual environment in the game simulates scenarios in the real world. A user may control a master virtual character in the game to perform actions such as walking, running, jumping, shooting, combating, driving, releasing a skill, being attacked by another virtual character, being harmed in the virtual environment, attacking another virtual character in the virtual environment, which has relatively high interactivity. In addition, a plurality of users may form a team online to play an arena game.

In some embodiments, a master virtual character selects a location in a virtual environment to release a skill. Such a skill is named regional skill. A regional skill indicator needs to select coordinates of a location in the virtual environment, and further includes selecting a virtual unit in the virtual environment, for example, a fort, a crystal, or a defensive tower. The master virtual character releases a regional skill in the virtual environment by using the regional skill indicator. The regional skill indicator is configured to identify a skill action region in the virtual environment where the master virtual character releases a skill.

The embodiments of this application are described by using an example in which a master virtual character in a game releases a regional skill.

FIG. 1 is a schematic diagram of a camera model moving interface according to an exemplary embodiment of this application. A virtual environment picture seen by a user is a picture captured by a camera model provided in a virtual environment. The camera model corresponds to a lens anchor point. The lens anchor point is 3D position coordinates of the camera model in the virtual environment. A position of the camera model is changed by changing the lens anchor point. This embodiment of this application is described by using an example in which the height of the camera model remains unchanged (that is, coordinates corresponding to the height remain unchanged), and only horizontal and vertical coordinates of the camera model on a horizontal plane are changed. Schematically, a terminal used by the user is a smartphone.

A master virtual character 100 may be located anywhere in the virtual environment. Schematically, as shown in (a) of FIG. 1, the master virtual character 100 is displayed in the center of the virtual environment picture. In this case, the master virtual character 100 prepares to release a regional skill.

When the user triggers a skill control, a wheel virtual joystick 102 is displayed on the skill control. The wheel virtual joystick 102 includes a wheel part and a joystick part. A regional skill indicator 101 is displayed on the ground of the virtual environment. As shown in (b) of FIG. 1, the regional skill indicator 101 moves in the virtual environment in a direction in which the user drags the wheel virtual joystick 102. The camera model is offset toward a moving direction of the regional skill indicator 101, and a position at which the master virtual character is located 100 in the virtual environment remains unchanged. The virtual environment picture is offset toward a direction away from the master virtual character 100, and the user sees that the master virtual character 100 is located at a region on a side of the virtual environment picture. In this case, the user can see a target region selected by the regional skill indicator 101, that is, a skill action region of a regional skill.

As shown in (c) of FIG. 1, the master virtual character 100 releases a regional skill (not shown), and the regional skill indicator disappears. A virtual environment picture captured by the camera model is a virtual environment picture shown in (c) of FIG. 1. That is, compared with a virtual environment picture shown in (b) of FIG. 1, the position of the camera model does not change.

After the master virtual character 100 releases the regional skill, the camera model moves toward the master virtual character 100 to form a virtual environment picture shown in (a) of FIG. 1. Schematically, the master virtual character 100 is located in the center of the virtual environment picture again.

Depending on different action ranges of regional skills used by the master virtual character, the camera model moves in the following three manners: 1. The camera model moves according to a relative position relationship between the regional skill indicator and a visual field determining box (the visual field determining box is a frame that is set in the virtual environment and invisible to the user); 2. The camera model is offset in the virtual environment according to a region selected by the regional skill indicator and a particular ratio; 3. The camera model is offset according to a type of a used regional skill.

In this embodiment, the camera model is moved with the regional skill indicator, so that the user can see a virtual environment picture at an aiming position, thereby avoiding a deviation of the aiming caused by an obstructed visual field of the user, and improving the man-machine interaction efficiency.

Figure 2:
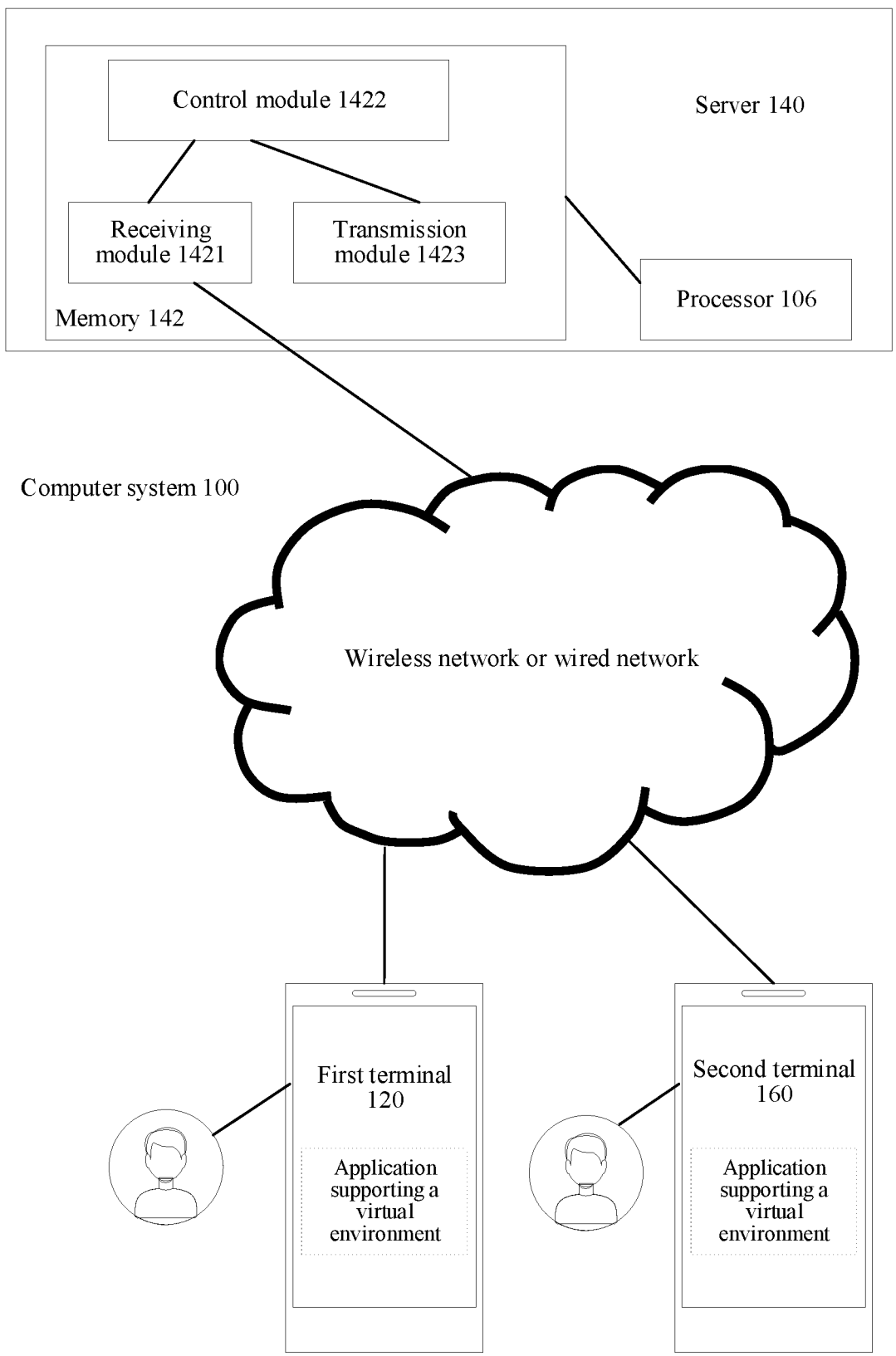
FIG. 2 is a block diagram of a computer system according to an exemplary embodiment of this application.

FIG. 2 is a structural block diagram of a computer system according to an exemplary embodiment of this application. The computer system 100 includes a first terminal 120, a server 140, and a second terminal 160.

An application supporting a virtual environment is installed and run on the first terminal 120. The application may be any one of a VR application, a 3D map program, a military simulation program, an FPS game, a MOBA game, a multiplayer shooting survival game, and a battleground shooting game. The first terminal 120 is a terminal used by a first user, and the first user uses the first terminal 120 to control a first master virtual character in the virtual environment to perform a movement. The movement includes, but is not limited to, at least one of body posture adjustment, walking, running, jumping, releasing a skill, picking-up, attacking, and avoiding an attack from another virtual character. Schematically, the first master virtual character is a first virtual person, for example, a simulated person character or a cartoon person character. Schematically, the first master virtual character releases a regional skill in the virtual environment, and the virtual environment picture moves from a position at which the master virtual character is located to a target region selected by a regional skill indicator. The regional skill indicator is used for the master virtual character to select a skill action region when releasing a skill.

The first terminal 120 is connected to the server 140 by using a wireless network or a wired network.

The server 140 includes at least one of one server, a plurality of servers, a cloud computing platform, and a virtualization center. Schematically, the server 140 includes a processor 144 and a memory 142. The memory 142 further includes a receiving module 1421, a control module 1422, and a transmission module 1423. The receiving module 1421 is configured to receive a request transmitted by a client, such as a team request. The control module 1422 is configured to control rendering of a virtual environment picture. The transmission module 1423 is configured to transmit a message notification to the client, such as a team success notification. The server 140 is configured to provide a backend service for an application supporting a 3D virtual environment. Optionally, the server 140 is responsible for primary computing work, and the first terminal 120 and the second terminal 160 are responsible for secondary computing work; alternatively, the server 140 is responsible for secondary computing work, and the first terminal 120 and the second terminal 160 are responsible for primary computing work; alternatively, collaborative computing is performed by using a distributed computing architecture among the server 140, the first terminal 120, and the second terminal 160.

The second terminal 160 is connected to the server 140 by using a wireless network or a wired network.

An application supporting a virtual environment is installed and run on the second terminal 160. The application may be any one of a VR application, a 3D map program, a military simulation program, an FPS game, a MOBA game, a multiplayer shooting survival game, and a battle royale shooting game. The second terminal 160 is a terminal used by a second user, and the second user uses the second terminal 160 to control a second master virtual character in the virtual environment to perform a movement. The movement includes, but is not limited to, at least one of body posture adjustment, walking, running, jumping, releasing a skill, picking-up, attacking, and avoiding an attack from another master virtual character. Schematically, the second master virtual character is a second virtual person, for example, a simulated person character or a cartoon person character.

Optionally, the first virtual person character and the second virtual person character are located in the same virtual environment. Optionally, the first virtual person character and the second virtual person character may belong to the same team or the same organization, have a friend relationship, or have a temporary communication permission.

Optionally, applications installed on the first terminal 120 and the second terminal 160 are the same, or applications installed on the two terminals are the same type of applications on different control system platforms. The first terminal 120 may be generally one of a plurality of terminals, and the second terminal 160 may be generally one of a plurality of terminals. In this embodiment, only the first terminal 120 and the second terminal 160 are used as examples for description. The first terminal 120 and the second terminal 160 are of the same or different device types. The device type includes at least one of a smartphone, a tablet computer, an e-book reader, a moving picture experts group audio layer III (MP3) player, a moving picture experts group audio layer IV (MP4) player, a laptop, and a desktop computer. The following embodiment is described by using an example that the terminal includes a smartphone.

A person skilled in the art may learn that there may be more or fewer terminals. For example, there may be only one terminal, or there may be dozens of or hundreds of or more terminals. The quantity and the device type of the terminals are not limited in the embodiments of this application.

Figure 3:
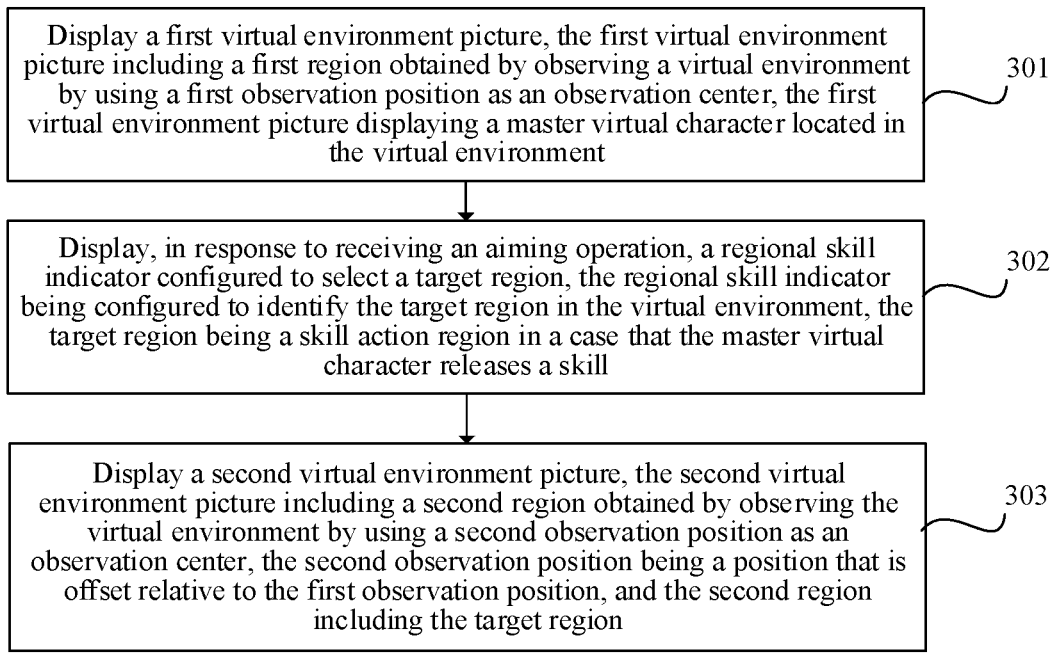
FIG. 3 is a flowchart of a method for displaying a virtual environment picture according to an exemplary embodiment of this application.

FIG. 3 is a flowchart of a method for displaying a virtual environment picture according to an exemplary embodiment of this application. The method may be performed by the first terminal 120 or the second terminal 160 in the computer system 100 shown in FIG. 2 or another terminal in the computer system. The method includes the following steps.

Step 301: Display a first virtual environment picture of a virtual environment, the first virtual environment picture including a first region obtained by observing the virtual environment by using a first observation position as an observation center, the first virtual environment picture displaying a master virtual character located in the virtual environment.

A terminal used by a user runs an application supporting a virtual environment. When the user runs the application, a display screen of the terminal correspondingly displays a user interface (UI) of using the application. A virtual environment picture is included in the UI. A virtual environment displayed on the virtual environment picture includes at least one of the following elements: a mountain, a plain, a river, a lake, a sea, a desert, sky, a plant, a building, and a vehicle.

In some embodiments, the virtual environment is a virtual environment with an arbitrary boundary shape. For example, the virtual environment is in the shape of rhombus. The user may browse a full picture of a virtual environment by viewing a map corresponding to the virtual environment. A camera model is provided in the virtual environment. The camera model is configured to observe the virtual environment from different perspectives to obtain virtual environment pictures.

Perspective is an observation angle at which observation is performed in a virtual environment from a first-person perspective or a third-person perspective of a master virtual character.

Optionally, the camera model automatically follows the master virtual character in the virtual environment. That is, when a position at which the master virtual character is located changes in the virtual environment, the camera model changes at the same time with the position at which the master virtual character is located in the virtual environment, and the camera model is always located in a preset distance range of the master virtual character in the virtual environment. Optionally, in an automatic following process, a relative position between the camera model and the master virtual character changes or remains unchanged.

The camera model is a 3D model located around the master virtual character in the virtual environment. When a first-person perspective is used, the camera model is located near the head of the master virtual character or at the head of the master virtual character. When a third-person perspective is used, the camera model may be located behind the master virtual character and bound to the master virtual character, or may be located at any position away from the master virtual character by a preset distance. The master virtual character located in the 3D virtual environment may be observed from different angles by using the camera model. Optionally, when the third-person perspective is a first-person over-shoulder perspective, the camera model is located behind the master virtual character (for example, the head or the shoulders of a virtual person character). Optionally, in addition to the first-person perspective and the third-person perspective, the perspective further includes other perspectives, for example, a look-down perspective; in a case of adopting the look-down perspective, the camera model may be located above the head of the master virtual character, and the look-down perspective is a perspective for observing the virtual environment from an aerial look-down angle. Optionally, the camera model is not actually displayed in the virtual environment. In other words, the camera model is not displayed in the virtual environment picture displayed in the UI.

Descriptions are made by using an example in which the camera model is located at any position away from the master virtual character by a preset distance. Optionally, a master virtual character corresponds to a camera model. The camera model may rotate about the master virtual character. For example, the camera model rotates about any point of the master virtual character. In a rotating process, the camera model not only rotates in angle, but is also offset in displacement. During rotating, a distance between the camera model and a rotating center remains unchanged. That is, the camera model is rotated on a sphere surface using the rotating center as a sphere center, where any point of the master virtual character may be any point of the head and trunk of the master virtual character or around the master virtual character, which is not limited in the embodiments of this application. Optionally, when the camera model observes the master virtual character, a center orientation of the perspective of the camera model points to a direction of a point of the sphere surface where the camera model is located pointing to the sphere center.

Optionally, the camera model may further observe the master virtual character from different directions of the master virtual character at a preset angle.

Figure 4:
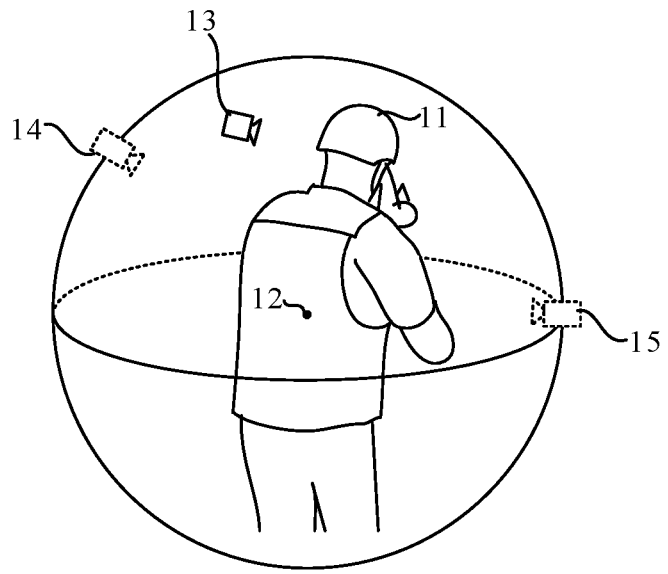
FIG. 4 is a schematic diagram of a camera model corresponding to a perspective of a master virtual character according to an exemplary embodiment of this application.

Schematically, with reference to FIG. 4, a point in a master virtual character 11 is determined as a rotating center 12; the camera model rotates around the rotating center 12. Optionally, the camera model is provided with an initial position. The initial position is a position behind and above the master virtual character (for example, a rear position of the brain). Schematically, as shown in FIG. 4, the initial position is position 13. When the camera model rotates to a position 14 or a position 15, the perspective direction of the camera model changes as the rotation of the camera model.

In some embodiments, the perspective of the camera model is switched through a manual operation by a user. For example, the user selects a target to be viewed on a map corresponding to the virtual environment, and the camera model switches, according to an operation performed by the user, the perspective to a perspective corresponding to the target selected by the user. The virtual environment picture in this perspective displays the target selected by the user, and does not display the master virtual character controlled by the user.

The first observation position is a corresponding observation position in the virtual environment when the camera model observes the virtual environment at a first camera position (for example, the position 14 in FIG. 4). There is an intersection between a straight line that starts from the lens of the camera model and is projected along the observation direction (or a camera direction) and the virtual environment. The intersection is the observation position. The first observation position corresponds to any position in the virtual environment, and the first observation position includes a position at which the master virtual character is located.

The first region is a region obtained by observing the virtual environment by using the first observation position as an observation center. The first region may be any shape, such as a circle, a rectangle, or an irregular shape. In some embodiments, the first region is a region seen by the user through the display screen of the terminal. In some other embodiments, the first region is beyond a region displayed on the display screen (the region is a part of the virtual environment), or the first region is a region corresponding to the entire virtual environment.

The first virtual environment picture may be a corresponding virtual environment picture when the master virtual character does not release a regional skill, or may be a corresponding virtual environment picture after the master virtual character releases a regional skill once.

The master virtual character is a movable object in the virtual environment. The master virtual character may be a virtual person, a virtual animal, a cartoon person, or the like. Different virtual characters release different skills in the virtual environment. Skills may be classified into a plurality of types according to releasing manners of the skills, for example, regional skills, directional skills, auto-locking skills, and the like. After the user selects a skill action region in which a regional skill is released in the virtual environment, the skill is released by the master virtual character in the skill action region. After the user selects a releasing direction in the virtual environment, a directional skill is released by the master virtual character toward the selected direction. An auto-locking skill automatically locks a target unit located near the master virtual character for releasing when released. This embodiment of this application is described by using an example in which the master virtual character releases a regional skill.

A skill is an ability that is used or released by a virtual character to attack another virtual character (including another virtual character and the virtual character itself) and generate a debuff or a buff. Skills include active skills and passive skills. The active skill is a skill that is actively used or released by a virtual character. The passive skill is a skill that is automatically triggered when a passive condition is met. Exemplarily, the skill mentioned in this embodiment is an active skill that is actively used and released by the master virtual character controlled by the user.

Step 302: Display, in response to receiving an aiming operation associated with the main master virtual character, a regional skill indicator configured to select a target region, the regional skill indicator being configured to identify the target region in the virtual environment, the target region being a skill action region where the master virtual character releases a skill.

The regional skill is a skill that the master virtual character needs to select a skill action region for release when releasing the skill. The master virtual character selects the target region in the virtual environment by using the regional skill indicator, and releases the regional skill in the target region. When released, the regional skill generates a skill effect on a virtual unit located in the target region. For example, the virtual unit includes a virtual character, a crystal, a fort, a defensive tower, or the like. In some embodiments, the master virtual character releases the regional skill in the following manner: The user performs a release operation (or an aiming operation) of the regional skill, for example, triggers a release control of the regional skill, to display a wheel virtual joystick for controlling the regional skill indicator, and display the regional skill indicator in the virtual environment picture. The user may control a position of the regional skill indicator in the virtual environment by controlling the wheel virtual joystick. The regional skill indicator may be located at any position in the virtual environment. A region selected by the regional skill indicator represents a skill action region of the regional skill, and the skill action region is also the target region identified by the regional skill indicator in the virtual environment. In an example in which the release operation of the skill is that the user drags the wheel virtual joystick to control the regional skill indicator to select the target region and then releases the hand, when the user releases the hand (stops a drag operation), a region currently selected by the regional skill indicator is used as the target region, and the master virtual character releases the regional skill in the target region. The skill action region of the regional skill may be any shape, such as a circle, a rectangle, a triangle, a polygon, an irregular shape, or the like. This embodiment of this application is described by using an example in which the action region is a circle. Exemplarily, the shape of the regional skill indicator is the same as the shape of the skill action region of the regional skill.

In some embodiments, there is a partially overlapping region between the target region and the first region. That is, a part of the target region is located outside the first region; or the target region does not overlap the first region, that is, the target region is located outside the first region.

When the terminal used by the user is a terminal with a touch display screen, for example, a smartphone or a tablet computer, the aiming operation is generated by the user triggering a UI control or generated through a gesture operation that is of releasing the regional skill and that is implemented on the touch display screen. In some embodiments, the UI control is also named a skill release control or a regional skill release control. A name of a control is not limited in the embodiments of this application.

When the terminal used by the user is a terminal connected to an external input device, for example, a desktop computer, or a notebook computer, the aiming operation is generated by the user triggering the external input device. For example, the user clicks a mouse or a handle connected to a desktop computer to control the master virtual character to release the regional skill.

Step 303: Display a second virtual environment picture, the second virtual environment picture including a second region obtained by observing the virtual environment by using a second observation position as an observation center, the second observation position being a position that is offset relative to the first observation position, and the second region including the target region.

The camera model is moved from the first camera position to a second camera position (as shown in FIG. 4, moved from the position 14 to the position 13) to form the second virtual environment picture. The second observation position is an observation position corresponding to the center of the obtained second virtual environment picture in the virtual environment when the camera model observes the virtual environment at the second camera position. The second observation position is obtained by offsetting based on the first observation position. The second virtual environment picture is formed by using the second observation position as an observation center.

The second region is a region obtained by observing the virtual environment by using the second observation position as an observation center. The second region may be any shape, such as a circle, a rectangle, or an irregular shape. The target region is located in the second region. In some embodiments, the second region is a region range of the virtual environment seen by the user through the display screen of the terminal.

The second virtual environment picture is a virtual environment picture when the regional skill indicator is displayed, according to the aiming operation, to select the target region of the regional skill, that is, a virtual environment picture displayed in an aiming process before the regional skill is released. Exemplarily, the second virtual environment picture may alternatively be a virtual environment picture displayed when the regional skill is released on the target region after the target region in the virtual environment is selected by using the regional skill indicator according to the aiming operation, that is, a virtual environment picture displayed when the regional skill is released.

Based on the above, in the method provided in this embodiment, a client receives an aiming operation, displays, according to a target region selected through the aiming operation, a regional skill indicator on the target region, and adjusts an observation center of a virtual environment picture according to the selected target region, so that the virtual environment picture includes the whole target region, The client displays the entire target region in the virtual environment picture by using the target region as the observation center, so that the user can observe a skill action region of a regional skill, and determine an action range of the released regional skill, thereby reducing cases that the user controls the master virtual character to release the regional skill in the virtual environment based on feeling, improving the accuracy of releasing the skill, and improving the man-machine interaction efficiency. By optimizing a display manner of the virtual environment picture, the user sees a more complete regional skill indicator, so that the user can more accurately control the regional skill indicator to aim at an attack target, thereby improving the efficiency of user operations and reducing the time of accurately selecting the target region through the aiming operation, avoiding a case that the user performs a long-term aiming operation because the user cannot accurately observe an action region of the skill, and further reducing invalid calculations of the client during an aiming process, and improving the running efficiency of the client.

The method for displaying a virtual environment picture is described with reference to the UI.

Figure 5:
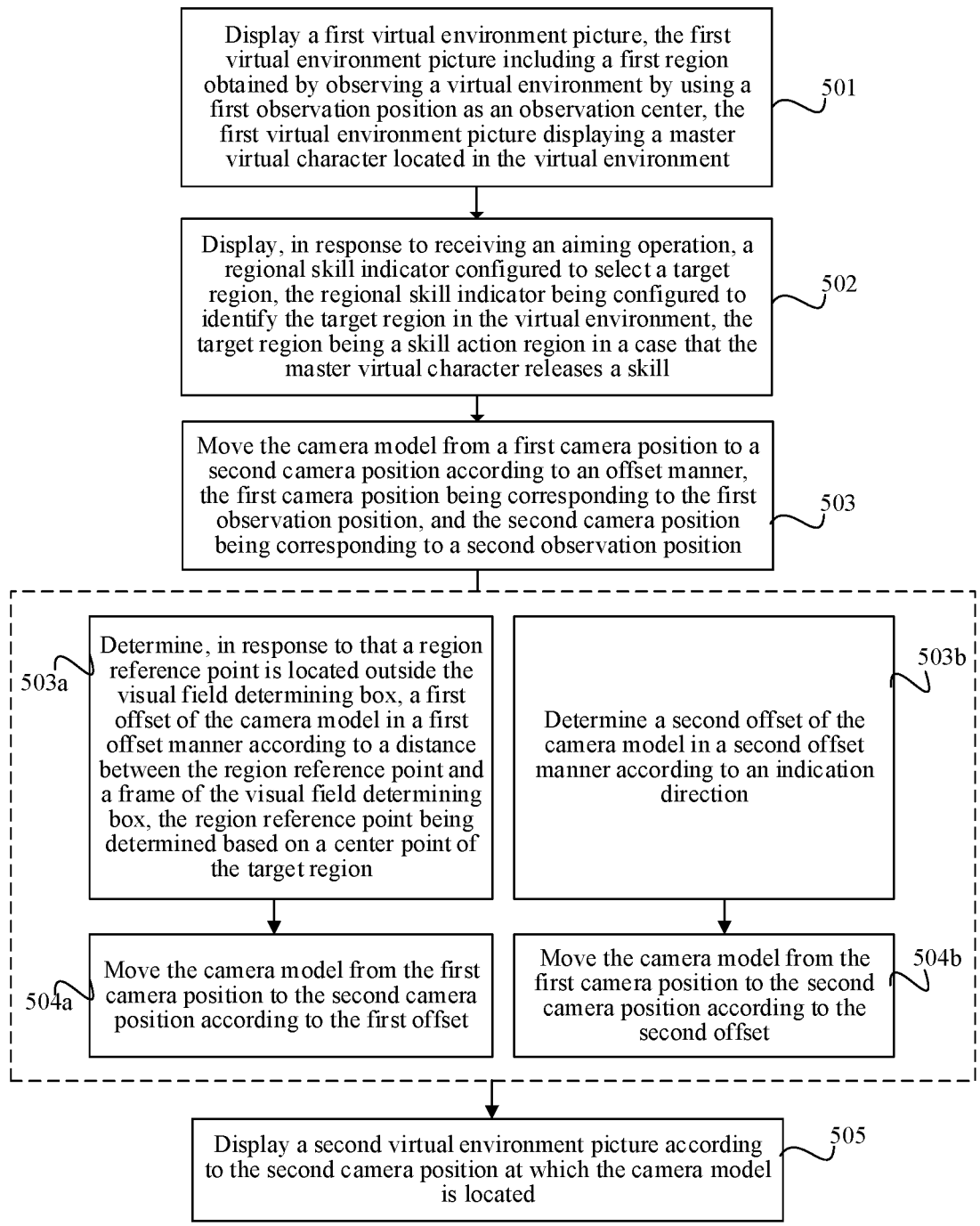
FIG. 5 is a flowchart of a method for displaying a virtual environment picture according to another exemplary embodiment of this application.

FIG. 5 is a flowchart of a method for displaying a virtual environment picture according to another exemplary embodiment of this application. The method may be performed by the first terminal 120 or the second terminal 160 in the computer system 100 shown in FIG. 2 or another terminal in the computer system. The method includes the following steps.

Step 501: Display a first virtual environment picture of a virtual environment, the first virtual environment picture including a first region obtained by observing a virtual environment by using a first observation position as an observation center, the first virtual environment picture displaying a master virtual character located in the virtual environment.

Figure 6:
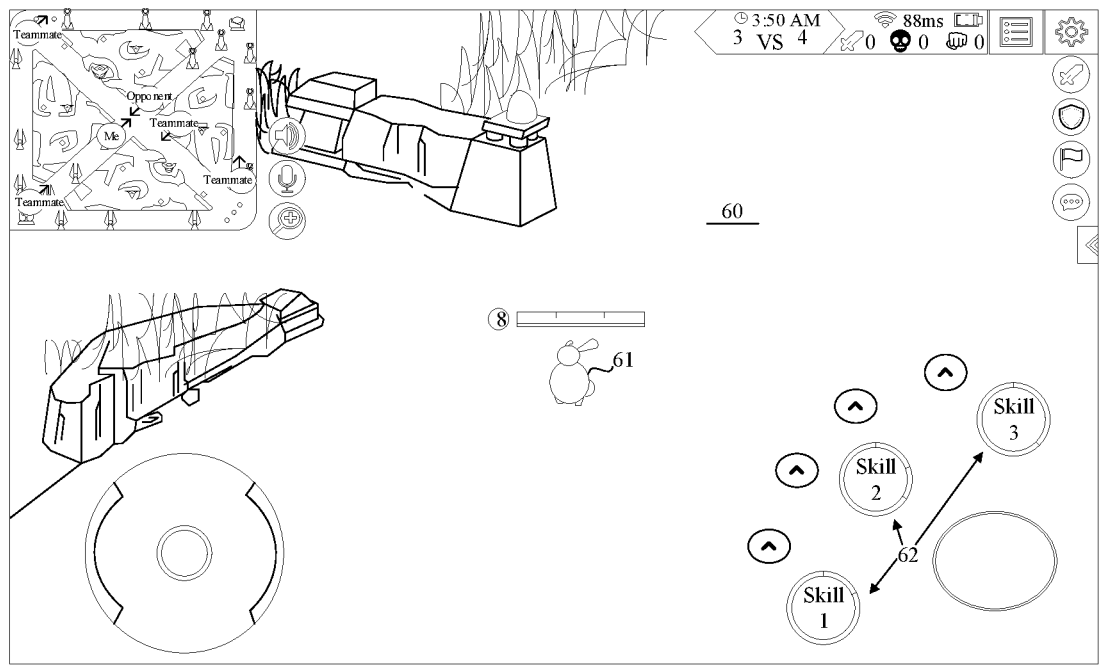
FIG. 6 is a schematic diagram of a first virtual environment picture according to an exemplary embodiment of this application.

Schematically, an example in which a terminal used by a user includes a smartphone is used. As shown in FIG. 6, a UI of a game program is displayed on a display screen of the terminal. The UI displays a first virtual environment picture 60, and the first virtual environment picture 60 includes a master virtual character 61. The first virtual environment picture 60 includes a first region. The first region is a region as large as a region displayed by the first virtual environment picture 60.

In an example, the first region is a region displayed by the first virtual environment picture 60, and the master virtual character 61 is located in the first region.

The UI further includes a UI control 62. The UI control 62 is configured to control the master virtual character to release a skill in the virtual environment when the UI control is triggered by the user. In some embodiments, the user triggers different UI controls 62 to release different types of skills. This embodiment of this application is described by using an example in which the master virtual character is controlled to release a regional skill.

Step 502: Display, in response to receiving an aiming operation associated with the main master virtual character, a regional skill indicator configured to select a target region, the regional skill indicator being configured to identify the target region in the virtual environment, the target region being a skill action region where the master virtual character releases a skill.

Figure 7:
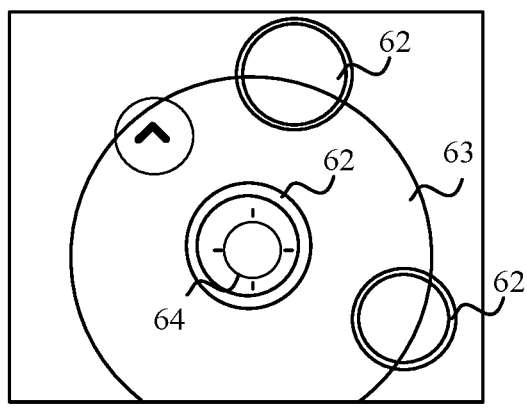
FIG. 7 is a schematic diagram of a wheel virtual joystick according to an exemplary embodiment of this application.
Figure 8:
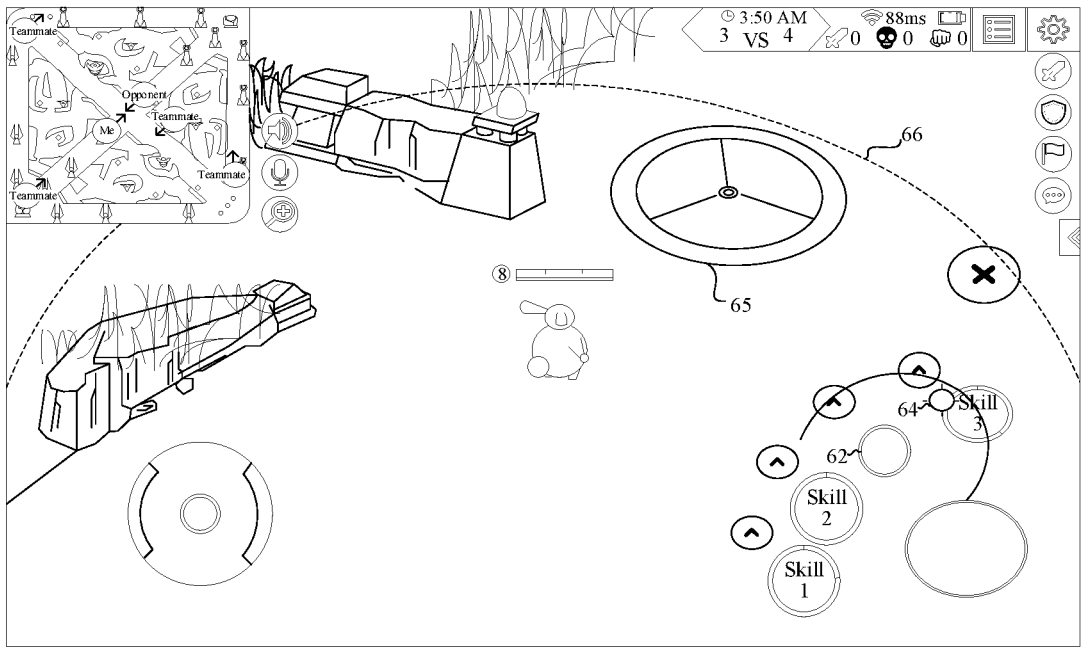
FIG. 8 is a schematic diagram of an interface on which a regional skill indicator is displayed according to an exemplary embodiment of this application.

Schematically, the user triggers the UI control on the UI, and the terminal receives the aiming operation. In an example, the UI control 62 is configured to control the master virtual character to release the regional skill. When the user clicks the UI control 62, a wheel virtual joystick shown in FIG. 7 is displayed. The wheel virtual joystick includes a wheel part 63 and a joystick part 64. By dragging the joystick part 64, a regional skill indicator 65 is controlled to display a position in the virtual environment shown in FIG. 8. In some embodiments, the joystick part 64 may alternatively be another shape such as a triangle, or a rectangle; or the joystick part 64 is a ray directed from the center of the regional skill indicator to an edge of the wheel part 63. The target region selected by the regional skill indicator in the virtual environment is indicated through a direction of the ray.

Schematically, the regional skill indicator 65 is circular, and a region identified by the regional skill indicator 65 is the target region in which the master virtual character releases the regional skill. The target region is a circle and an action range of the regional skill is the target region. In some embodiments, the area of the target region is related to the action range of the regional skill, or is related to the type of the regional skill. For example, a larger action range of the regional skill indicates a larger area of the target region.

In some embodiments, the regional skill indicator 65 is released in a selection region 66, and the selection region 66 is used for providing a selection range for the regional skill indicator 65 to select the target region. The selection region 66 may be a part of the virtual environment, or may be a region corresponding to the whole virtual environment. Optionally, the selection region is a region centered on a position at which the master virtual character is located. The shape of the selection region may be arbitrary. For example, the selection region is a circle.

In some embodiments, a manner of releasing the regional skill may be that the master virtual character selects the target region in the virtual environment and releases the skill in the target region. Exemplarily, a released skill generates an effect on a virtual unit located in the target region. For example, the virtual unit includes a virtual character, a crystal, a fort, a defensive tower, or the like. Alternatively, the released regional skill generates an effect on the virtual environment in the target region, for example, changes a terrain attribute of the target region, creates a new terrain in the target region, or places a trap in the target region; or the released regional skill associates the master virtual character with the target region, for example, transfers the virtual character to the target region.

Step 503: Move the camera model from a first camera position to a second camera position according to an offset manner, the first camera position being corresponding to the first observation position, and the second camera position being corresponding to a second observation position.

The camera model is provided in the virtual environment. The camera model is configured to observe the virtual environment to obtain a virtual environment picture. The first virtual environment picture is switched to the second virtual environment picture for display by changing a position of the camera model.

As shown in FIG. 4, schematically, the first camera position is a position 13. A picture of the virtual environment observed or captured by the camera model at the position 13 is the first virtual environment picture. The camera model is moved to the second camera position according to an offset manner. The second camera position is a position 15. A picture of the virtual environment observed or captured by the camera model at the position 15 is the second virtual environment picture.

In some embodiments, the offset manner includes a moving speed of the camera model. For example, the camera model is moved from the first camera position to the second camera position at a uniform speed. In some other embodiments, the offset manner includes a manner of triggering the camera model to move. That is, after a trigger condition is met, the camera model is triggered to move. In some other embodiments, a movement manner of the camera model includes a moving distance of the camera model. For example, when an action range of the regional skill released by the master virtual character is relatively small, the moving distance of the camera model is relatively smaller, or an action range of the regional skill released by the master virtual character is relatively large, the moving distance of the camera model is relatively large. This embodiment of this application is described by using an example in which the offset manner includes the manner of triggering the camera model to move.

The offset manner of the camera model includes at least one of a first offset manner and a second offset manner. When the camera model is offset in the first offset manner, step 503 may be replaced with the following step:

Step 503*a*: Determine, in response to that a region reference point is located outside the visual field determining box, a first offset of the camera model in the first offset manner according to a distance between the region reference point and a frame of the visual field determining box, the region reference point being determined based on a center point of the target region.

The first offset manner is a manner in which the camera model is offset based on a visual field determining box, and the visual field determining box is configured to indicate a visual field range of the camera model. The visual field determining box is an invisible frame set in the virtual environment picture. The visual field determining box is a frame that uses an observation center of the camera model as a center point and that is parallel to a horizontal plane. At least one frame of the visual field determining box is perpendicular to an observation direction of the camera model.

The shape of the visual field determining box is determined according to the shape of the display screen of the terminal (and another factor). The center of the visual field determining box is a position at which the camera model is aimed in the virtual environment. In an example in which the screen of the terminal is a rectangle, the position at which the camera model is aimed in the virtual environment is used as the center of the visual field determining box, and the length and width of the visual field determining box are determined according to the length and width of the screen. The size of the visual field determining box is slightly smaller than that of the screen. A long side of the visual field determining box is perpendicular to the observation direction of the camera model, and a short side is parallel to the observation direction of the camera model; or the short side of the visual field determining box is perpendicular to the observation direction of the camera model, and the long side is parallel to the observation direction of the camera model. Exemplarily, the visual field determining box moves with the movement of the camera model in the virtual environment. Exemplarily, when the camera model is not offset, and the camera model uses the position at which the master virtual character is located as the observation center, the center of the visual field determining box is also located at the position at which the master virtual character is located.

Figure 9:
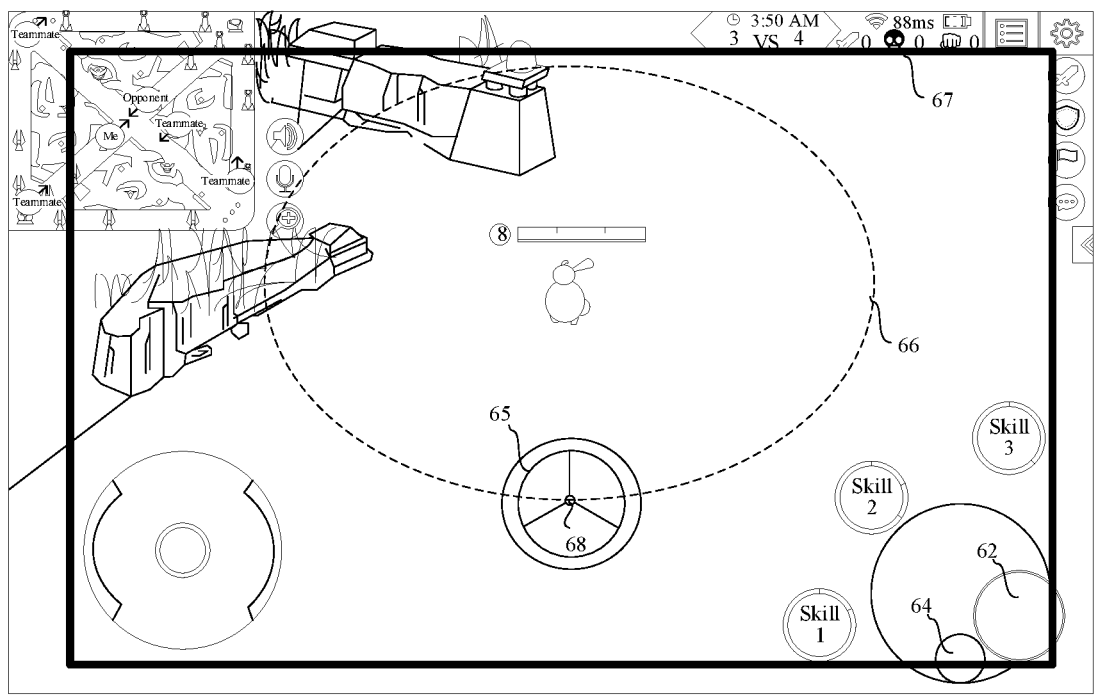
FIG. 9 is a schematic diagram of a visual field determining box according to an exemplary embodiment of this application.

As shown in FIG. 9, a visual field determining box 67 is displayed in a virtual environment picture. The visual field determining box 67 may alternatively be a circle, a triangle, a polygon, or the like. The shape of the visual field determining box 67 is not limited in this embodiment of this application. The size of the visual field determining box 67 may be set in advance, or set according to an offset distance of the camera model, or set according to an action range of a regional skill. The size of the visual field determining box 67 is not limited in this embodiment of this application. In this embodiment of this application, the visual field determining box 67 is only used as an example. In an actual situation, the visual field determining box 67 is not displayed in the virtual environment picture. That is, the user cannot see the visual field determining box 67 on the UI.

As shown in FIG. 9, a region reference point 68 is determined based on a center point of the regional skill indicator 65. When the region reference point 68 is outside the visual field determining box 67, the camera model is triggered to offset. The first offset of the camera model in the first offset manner is calculated based on a distance between the region reference point 68 and the visual field determining box 67.

Step 504*a*: Move the camera model from the first camera position to the second camera position according to the first offset.

The camera model is offset according to the first offset calculated in step 503*a*, and the first offset includes a first moving direction and a first moving distance of the camera model.

In the method provided in this embodiment, the visual field determining box is set, and the first offset of the camera model is determined according to the visual field determining box, so that the camera model can be accurately moved to a corresponding position, thereby accurately displaying the second virtual environment picture according to the position of the camera model.

When the camera model is offset in the second offset manner, step 503 may be replaced with the following step:

Step 503*b*: Determine a second offset of the camera model in the second offset manner according to an indication direction.

The second offset manner is a manner of offsetting based on the indication direction, and the indication direction is a direction pointing from a position at which the master virtual character is located to a center point of the target region.

Figure 10:
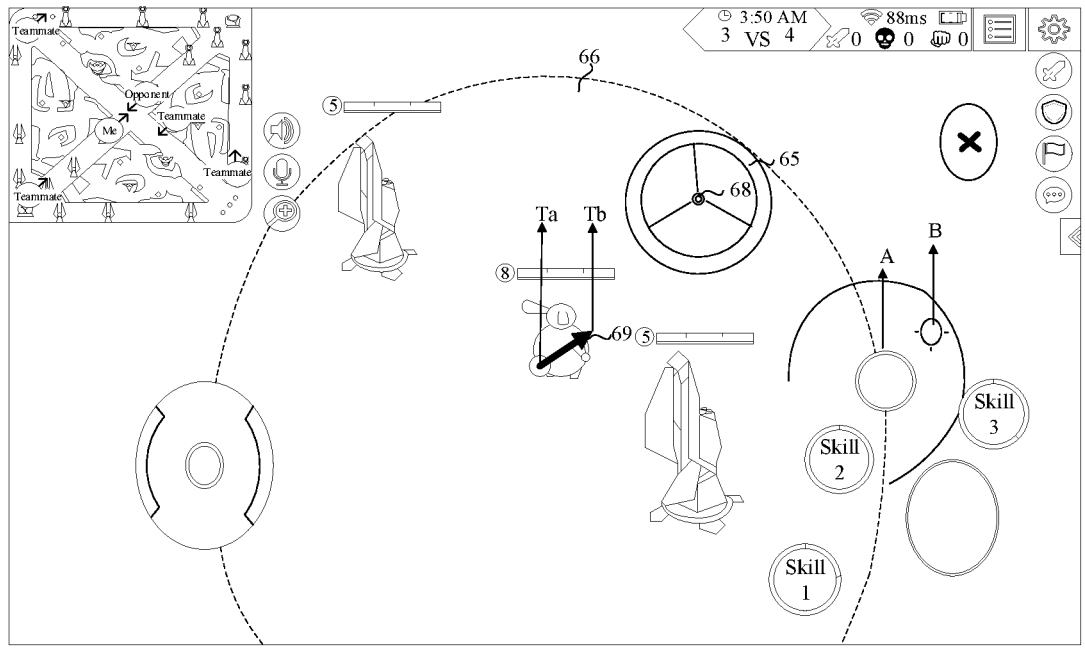
FIG. 10 is a schematic interface diagram of a second offset manner according to an exemplary embodiment of this application.

As shown in FIG. 10, the regional skill indicator 65 is displayed in a virtual environment picture. The regional skill indicator 65 corresponds to a center point 68. The regional skill indicator 65 identifies the target region in which the regional skill is released. The user selects a release position of the regional skill indicator 65 from a selection region 66.

The virtual environment picture further displays an indication direction 69. The indication direction points from a position at which the master virtual character is located to a center point of the regional skill indicator, that is, a center point of the target region.

The second offset of the camera model in the second offset manner is determined according to an angle between the indication direction and a horizontal direction, a distance corresponding to the indication direction, and an offset ratio.

Step 504*b*: Move the camera model from the first camera position to the second camera position according to the second offset.

The camera model is offset according to the second offset determined in step 504*a*, and the second offset includes a second moving direction and a second moving distance of the camera model.

In the method provided in this embodiment, the corresponding angle, the fixed offset distance, and the offset ratio are obtained through the direction indicated by the regional skill indicator to determine the second offset of the camera model, so that when a change of an action range of a skill released by the master virtual character is relatively large, the camera model can be accurately offset to a corresponding position according to the second offset, and the second virtual environment picture can be accurately displayed.

Step 505: Display the second virtual environment picture according to the second camera position at which the camera model is located.

After the camera model is moved to the second camera position, a picture captured or observed at the second camera position is displayed as the second virtual environment picture. The second virtual environment picture includes a second region observed at the second camera position in the virtual environment, and the second region includes the target region identified by the regional skill indicator.

It can be understood that the first offset manner and the second offset manner described above may be implemented separately or in combination, or may be implemented in combination with another offset manner.

Based on the above, in the method provided in this embodiment, a client controls the camera model to move from a first camera position to a second camera position in different offset manners, so that a whole target region selected by a regional skill indicator is displayed in a virtual environment picture captured by the camera model from a virtual environment, and the user can further completely observe a skill action region of a regional skill from the virtual environment picture, and determine an action range of the released regional skill based on the skill action region, thereby reducing cases that the user controls a master virtual character to release the regional skill in the virtual environment based on feeling, improving the accuracy of releasing the skill, improving the man-machine interaction efficiency, reducing invalid operations of the user in an aiming process, reducing an amount of logic calculation of the client caused by invalid operations, and improving the running efficiency of the client in a case of receiving a skill release operation.

The camera model corresponds to different offsets in different offset manners. The client controls the camera model to offset according to the different offsets, so that the camera model can accurately capture a virtual environment picture of a corresponding position, and the corresponding virtual environment picture can be accurately displayed on a UI.

Methods for determining the first offset and the second offset are respectively described below.

In the embodiment based on FIG. 5, when the camera model is offset in the first offset manner, the foregoing step 503*a* may be replaced with the following step:

Step S031*a*: Calculate a vertical distance between the region reference point and the frame of the visual field determining box in response to that the region reference point is located outside the visual field determining box, the vertical distance including at least one of a transverse vertical distance and a longitudinal vertical distance, the transverse vertical distance being a vertical distance between the region reference point and a longitudinal frame of the visual field determining box, and the longitudinal vertical distance being a vertical distance between the region reference point and a transverse frame of the visual field determining box.

Exemplarily, the transverse vertical distance is a vertical distance between the region reference point and a longitudinal frame of the visual field determining box, and the longitudinal vertical distance is a vertical distance between the region reference point and a transverse frame of the visual field determining box.

Figure 11:
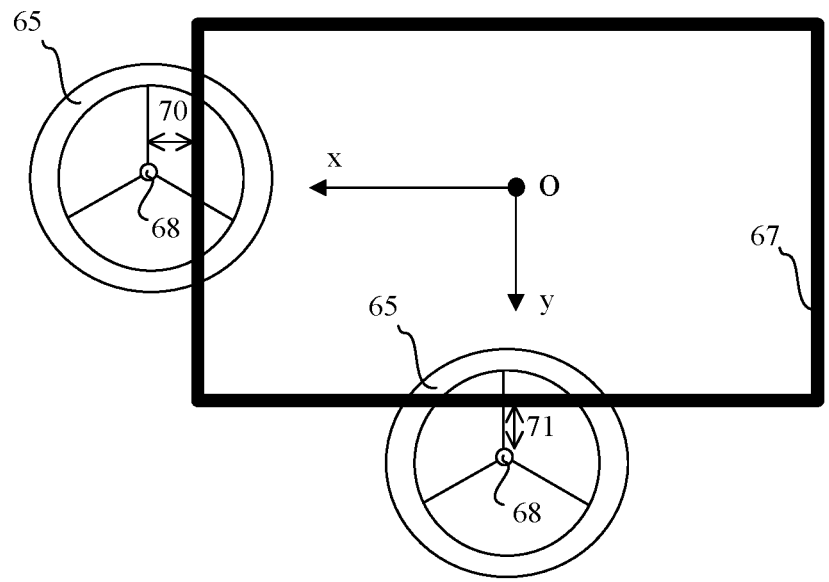
FIG. 11 is a schematic diagram of calculating a first offset according to an exemplary embodiment of this application.

As shown in FIG. 11, vertical distances between the regional skill indicator 65 and the visual field determining box 67 include a transverse vertical distance 70 and a longitudinal vertical distance 71. The transverse vertical distance 70 is a vertical distance from the region reference point 68 to the visual field determining box 67.

Schematically, a rectangular plane coordinate system is established in a virtual environment by using the master virtual character as an origin, an observation direction perpendicular to the camera model as the x axis, and an observation direction parallel to the camera model as the y axis. Schematically, the transverse vertical distance 70 is calculated. If coordinates of the region reference point 68 are (x1, y1), and coordinates of a point that is on the visual field determining box 67 and indicates a vertical distance from the region reference point 68 are (x2, y1), the transverse vertical distance 70 is (x1-x2), and a longitudinal vertical distance is 0 (vertical coordinates of the two points are the same).

Similarly, the longitudinal vertical distance 71 is calculated. If coordinates of the region reference point 68 are (x3, y3), and coordinates of a point that is on the visual field determining box 67 and indicates a vertical distance from the region reference point 68 are (x3, y4), the longitudinal vertical distance 71 is (x3-x4), and a transverse vertical distance is 0 (horizontal coordinates of the two points are the same).

Step S032a: Determine the vertical distance as the first offset of the camera model in the first offset manner.

In the first offset manner, the first offset includes at least one of a first transverse vertical distance and a first longitudinal vertical distance.

Based on the above, in the method provided in this embodiment, the visual field determining box is set, and the first offset of the camera model is calculated according to the vertical distance between the visual field determining box and the region reference point, so that coordinates of the camera model when the camera model is moved to a target position can be accurately determined, and the camera model can be further controlled to accurately move to the target position.

In the embodiment based on FIG. 5, schematically, when the user controls a placement position of the regional skill indicator by dragging the wheel virtual joystick, during dragging, the region reference point may be relocated in the visual field determining box. In this case, the camera model may be moved in the following manner.

Step 1: Move the camera model from the second camera position to a third camera position in response to that the region reference point is relocated in the visual field determining box, the third camera position being located between the second camera position and the first camera position, the third camera position being corresponding to a third observation position.

Schematically, using the second virtual environment picture in the foregoing embodiment as an example, the second virtual environment picture corresponds to the i$^{th}$ frame in a group of pictures. In this case, the region reference point is located outside the visual field determining box, and the camera model determines the first offset in the first offset manner according to a distance between the visual field determining box and the region reference point. After the camera model is offset according to the first offset, the picture enters the (i+1)$^{th}$ frame. When the regional skill indicator has not been released in the virtual environment, the visual field determining box automatically approaches the region reference point, so that the region reference point is located within the visual field determining box. In this case, the camera model is moved from the second camera position to the third camera position. The camera model is moved from the second camera position to the first camera position and does not reach the first camera position, which is similar to generating a "spring" effect. That is, when the user drags the wheel virtual joystick to control the regional skill indicator in a first direction to move, the camera model moves with the regional skill indicator. When the user drags the wheel virtual joystick to control the regional skill indicator in a direction opposite to the first direction to move, the camera model moves with the regional skill indicator in the direction opposite to the first direction.

Step 2: Display a third virtual environment picture according to the camera model located at the third camera position, the third virtual environment picture including a third region obtained by observing the virtual environment by using the third observation position as an observation center, the third region including the target region.

When the camera model performs a retraction movement similar to a "spring", the third virtual environment picture is displayed according to the position of the camera model. The target region selected by the regional skill indicator is always displayed in a region corresponding to the third virtual environment picture. Similar to the first region and the second region, the third region includes a region in a virtual environment displayed in the third virtual environment picture.

Based on the above, in the method provided in this embodiment, the user controls the regional skill indicator again to select the target region, so that the region reference point of the regional skill indicator is relocated in the visual field determining box, and the user controls the camera model to move to the third camera position, that is, "pulls back" the camera model, so as to control the camera model to offset when the region reference point is outside an original virtual environment picture, and control the camera model to retract synchronously when the region reference point is in the original virtual environment picture, thereby improving the continuity of the camera model when the camera model is offset, which helps the user to operate and observe.

In the embodiment based on FIG. 5, when the camera model is offset in the second offset manner, the foregoing step 503*b* may be replaced with the following step:

Step S031b: Obtain an angle between the indication direction and a horizontal direction, the horizontal direction being parallel to a horizontal plane in the virtual environment and perpendicular to an observation direction of the camera model.

The indication direction is a direction pointing from the master virtual character to the center point of the target region, for example, the indication direction 69 shown in FIG. 10.

Figure 12:
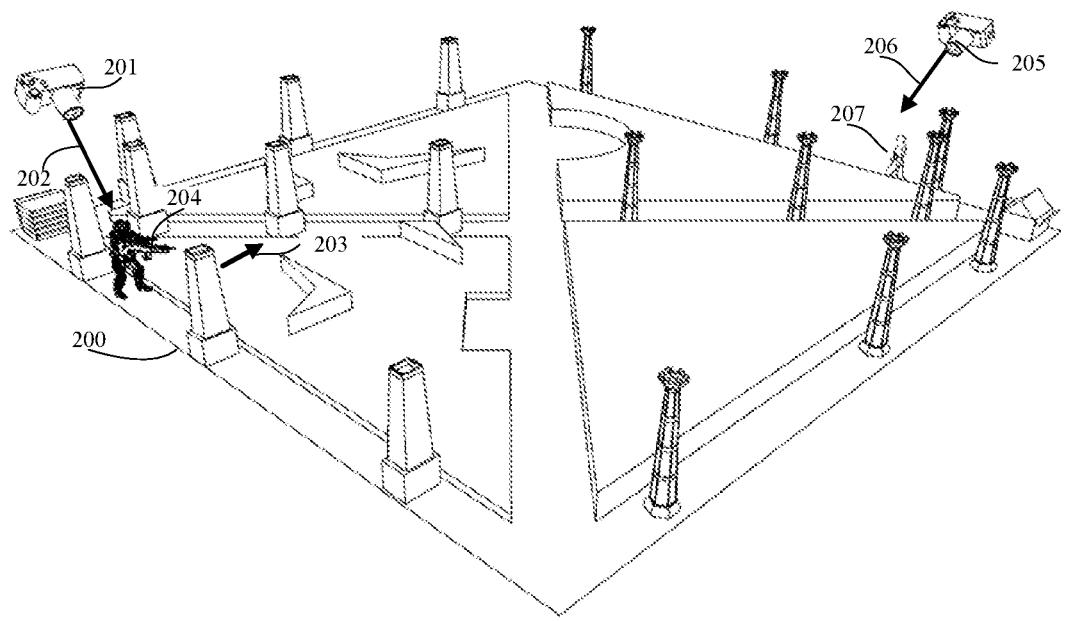
FIG. 12 is a schematic diagram of a position relationship between a camera model and a virtual environment according to an exemplary embodiment of this application.

As shown in FIG. 12, there is a master virtual character 204, a horizontal direction 203, and another virtual character 207 on a plane 200 on which a virtual environment is located. The master virtual character 204 corresponds to a camera model 201. It can be understood that an observation direction 202 of the camera model 201 is perpendicular to the horizontal direction 203, and the horizontal direction 203 is parallel to a horizontal plane of the virtual environment (that is, the plane 200 on which the virtual environment is located). The observation direction 202 of the camera model 201 is 45° with the horizontal plane. In some embodiments, the observation direction 202 is 60° or 90° with the horizontal plane, which is not limited in the embodiments of this application.

Step S032b: Obtain a fixed offset distance of the camera model corresponding to the indication direction.

When there is a specific angle between the indication direction and the horizontal direction, the fixed offset distance corresponding to the indication direction is obtained. In some embodiments, the fixed offset distance is preset or set according to an actual indication direction. In some embodiments, the indication direction includes any one of up, down, left, right, top left, bottom left, top right, and bottom right. The fixed offset distance includes at least one of a transverse offset distance and a longitudinal offset distance.

Step S033b: Obtain an offset ratio of the camera model in the second offset manner, the offset ratio being used for instructing the camera model to move according to the ratio.

The regional skill indicator may arbitrarily select a target region in a selection region. Therefore, according to different indication directions corresponding to target regions selected by the regional skill indicator, offsets of the camera model are also different.

Step S034b: Determine the second offset according to the angle, the fixed offset distance, and the offset ratio.

The second offset includes at least one of a transverse offset and a longitudinal offset.

Methods for determining the transverse offset and the longitudinal offset are respectively described below.

1. Determine the Transverse Offset According to a Product of a Cosine Value of the Angle, the Transverse Offset Distance, and the Offset Ratio.

The transverse offset distance includes at least one of a left offset distance and a right offset distance. The left and the right are respectively based on a forward direction of the virtual environment picture. The left offset distance is an offset distance corresponding to a direction pointed by the left side of the virtual environment picture, and the right offset distance is an offset distance corresponding to a direction pointed by the right side of the virtual environment picture.

The offset ratio is a ratio of a first distance to a second distance. The first distance is a distance between the position at which the master virtual character is located and the center point of the target region. The second distance is a radius of a selection region. The selection region is used for providing a selection range for the regional skill indicator to select the target region.

Figure 13:
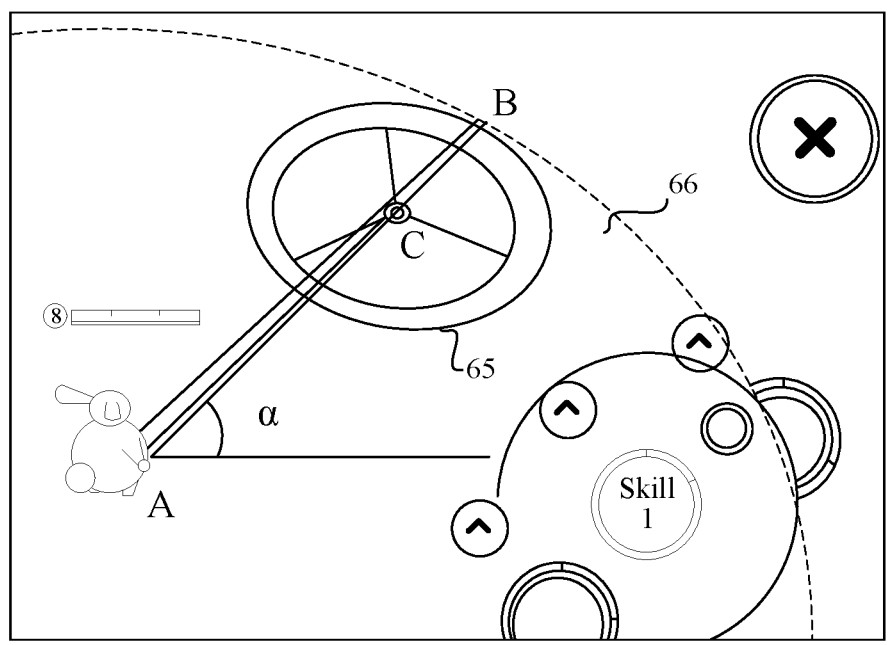
FIG. 13 is a schematic diagram of calculating a second offset according to an exemplary embodiment of this application.

As shown in FIG. 13, the regional skill indicator 65 is located at an edge of the selection region 66, the center point of the regional skill indicator is C, the position at which the master virtual character is located is A, and there is a point B on the selection region 66. The first distance is a distance AC, the second distance is a distance AB, and the offset ratio is AC/AB. In some embodiments, when the position at which the master virtual character is located is the center of the selection region, the second distance is the radius of the selection region. In some other embodiments, when the position at which the master virtual character is located is not the center of the selection region, the second distance is a distance between the position at which the master virtual character is located and the edge of the selection region.

The transverse offset X of the camera model may be calculated by using the following formula:

$$X = \cos \alpha * x * (AC/AB)$$

where a is the angle between the indication direction and the horizontal direction, x is the transverse offset distance, which is a fixed value, and AC/AB is the offset ratio.

2. Determine the Longitudinal Offset According to a Product of a Sine Value of the Angle, the Longitudinal Offset Distance, and the Offset Ratio.

The longitudinal offset distance includes at least one of an upper offset distance and a lower offset distance. The upper and the lower are respectively based on a forward direction of the virtual environment picture. The upper offset distance is an offset distance corresponding to a direction pointed by the upper side of the virtual environment picture, and the lower offset distance is an offset distance corresponding to a direction pointed by the lower side of the virtual environment picture.

Similar to the method for calculating the transverse offset, the longitudinal offset Y of the camera model may be calculated by using the following formula:

$$Y = \sin \alpha * y * (AC/AB)$$

where a is the angle between the indication direction and the horizontal direction, y is the longitudinal offset distance, which is a fixed value, and AC/AB is the offset ratio.

Based on the above, in the method provided in this embodiment, parameters (including the angle between the indication direction and the horizontal direction, the fixed offset distance corresponding to the indication direction, and the offset ratio) corresponding to a direction indicated by the regional skill indicator are obtained to calculate the second offset of the camera model, so that the camera model can be moved according to the ratio and an action range of a skill released by the master virtual character, and the regional skill indicator can be completely displayed in the virtual environment picture, thereby improving the man-machine interaction efficiency.

In addition to displaying the second virtual environment picture by moving the camera model in the foregoing embodiments, in some embodiments, the virtual environment picture captured by the camera model may alternatively be changed by changing a focal length of a lens corresponding to the camera model, or by changing an observation direction of the camera model and an angle of the virtual environment, for example, changing a pitch angle and a deflection angle of the camera model relative to the virtual environment, so that the camera model captures different virtual environment pictures from observation directions at different angles.

Figure 14:
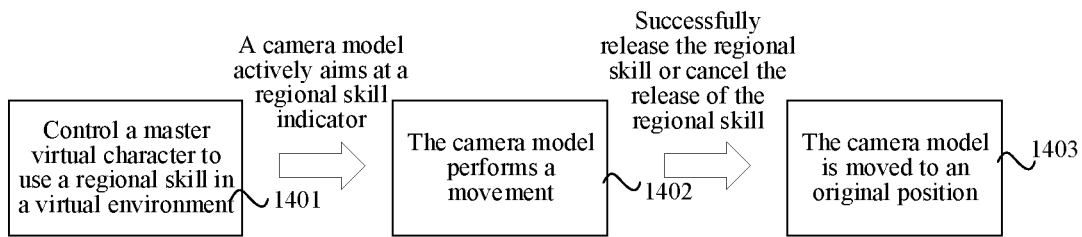
FIG. 14 is a framework diagram of a method for displaying a virtual environment picture according to an exemplary embodiment of this application.
Figure 15:
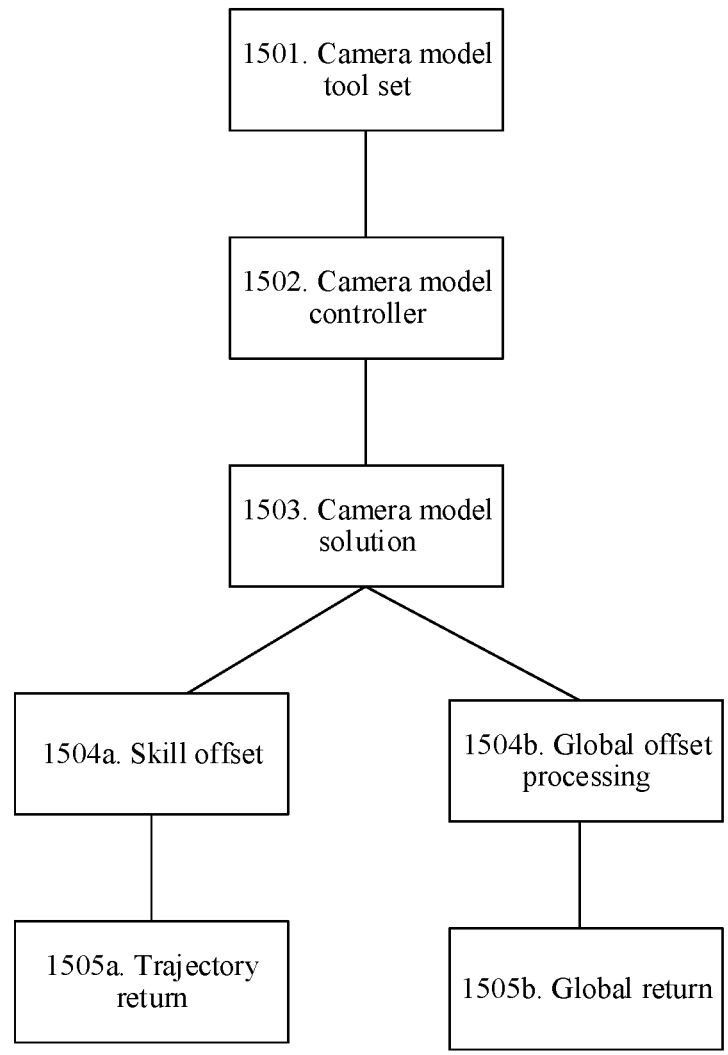
FIG. 15 is a framework diagram of a system of controlling a camera model to move according to an exemplary embodiment of this application.

The embodiments of this application provide a flowchart framework of a method for displaying a virtual environment picture. As shown in FIG. 14, the flowchart framework of the method is as follows:

When a user controls a master virtual character to use a regional skill (1401) in a virtual environment, the camera model actively aims at a regional skill indicator.

The camera model performs a movement (1402).

When the master virtual character successfully releases the regional skill or cancels the release of the regional skill, the camera model is moved to an original position (1403).

A camera position corresponding to the camera model when the camera model captures a corresponding virtual environment picture when the master virtual character does not use the regional skill, or captures a corresponding virtual environment picture at an end moment of using the regional skill once is the original position.

In some embodiments, the camera model is provided with a lens, and the lens may be changed according to an actual situation, so that different virtual environment pictures are displayed on a display screen of a terminal. For example, if a corresponding lens to magnify a virtual unit in the virtual environment is used, the virtual unit displayed in a virtual environment picture becomes larger.

In some embodiments, 3D position coordinates of the camera model in the virtual environment are represented by a lens anchor point. In this embodiment of this application, only a horizontal coordinate and a vertical coordinate (that is, plane coordinates) of a lens anchor point of the camera model are changed, which indicates that a coordinate of a height position of the camera model is not changed. That is, a relative distance between the camera model and the virtual environment is not changed, or a relative distance between the camera model and the master virtual character is not changed.

In order to prevent a virtual environment picture displayed by the camera model from causing the user to feel dizzy when the camera model has a relatively large offset, a maximum distance is generally limited when the camera model is offset. When the offset reaches the maximum distance, the camera model stops moving.

In some embodiments, when the camera model moves in the second offset manner, the coordinate corresponding to the height position of the camera model may be changed. For example, the camera model may be lifted to increase the relative distance between the camera model and the virtual environment, so that the camera model can capture a virtual environment with a larger area, more content is displayed in a virtual environment picture, and the user can see a virtual unit (another virtual character or virtual object in the virtual environment) farther away from the master virtual character.

Based on the above, when the user controls the master virtual character to use the regional skill indicator in the virtual environment, the camera model actively follows the regional skill indicator, so that the user can see the complete regional skill indicator, that is, a target region aimed at by the regional skill indicator, thereby improving the man-machine interaction efficiency.

The embodiments of this application provide a system framework of calculating the offset of the camera model. The system framework is as follows:

S1: Obtain a skill offset and a global offset of the camera model.

A camera model tool set 1501 (CameraActionUtils), also named lens module tool set, provides interfaces corresponding to various operations to the public, the operations including moving, rotating, lifting the camera model, or lifting a lens.

A camera model controller 1502 (CameraController), also named lens controller, is mainly configured to manage various data of the camera model or the lens and provide respective interfaces inside the lens module tool set.

A camera model solution 1503 (CameraAction), also named lens solution, is configured to set various data during a movement of the camera model. The movement is, for example, a uniform motion, a difference motion, or a smooth damping motion.

Skill offset processing 1504a (LocalMoveComponent) is to obtain solution parameters from the lens solution when the master virtual character releases a skill, and the camera model is moved every frame until the camera model reaches a target position. A skill offset is determined according to an offset manner, and the offset manner may be at least one of the first offset manner and the second offset manner in the foregoing embodiments. It can be understood that the flowchart framework further includes: trajectory return (SetLocalPosOff) 1505a, which is to control the camera model to return to a default camera position based on a skill offset.

Figure 16:
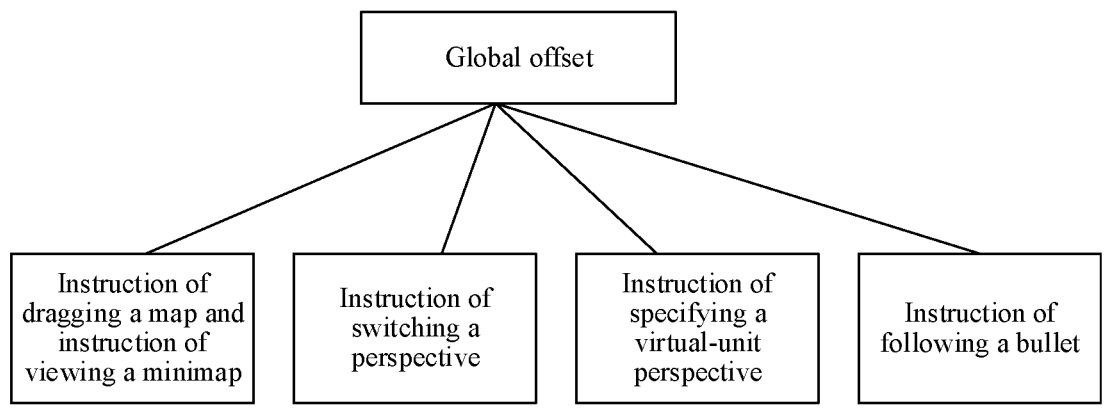
FIG. 16 is a framework diagram of calculating a global offset according to an exemplary embodiment of this application.

Global offset processing 1504b (GlobalMoveComponent) is to control the camera model to offset according to globally-common drag operations as shown in FIG. 16. The global offset is determined according to a control instruction of the camera model. The control instruction includes at least one of: an instruction of dragging a map, an instruction of viewing a minimap, an instruction of specifying a virtual-unit perspective, and an instruction of following a bullet. The instruction of dragging a map is used for switching and displaying a virtual environment picture corresponding to a selected location on a map. The instruction of viewing a minimap is used for opening a map representing a virtual environment and viewing a corresponding virtual unit on the map. The instruction of specifying a virtual-unit perspective is used for observing a virtual environment from the perspective of a selected virtual unit. For example, the master virtual character continues to observe a virtual environment from the perspective of a teammate after the master virtual character dies. The instruction of following a bullet is used for instructing, when an action range of a skill released by the master virtual character is relatively large or a released skill carries a bullet, the camera model to move in an action direction of the skill or following a flying bullet, until the skill is released. It can be understood that the flowchart framework further includes: global return (SetGlobalPosOff) 1505b, which is to control the camera model to return to the default camera position based on the global offset.

S2: Determine a sum of the skill offset and the global offset as the offset of the camera model.

In order to reduce cases that a conflict is generated when the camera model is moved, the offset of the camera model is classified into the skill offset and the global offset.

Figure 17:
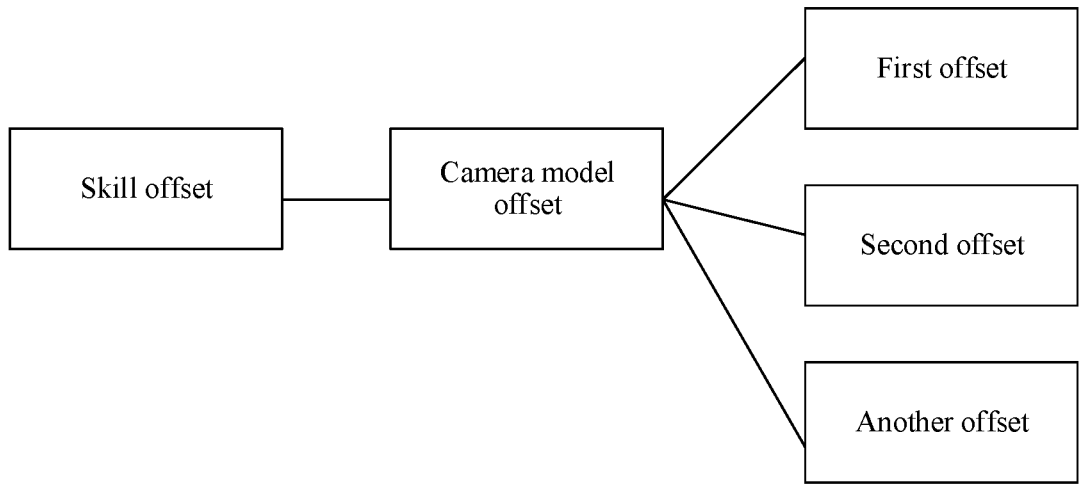
FIG. 17 is a framework diagram of calculating a skill offset according to an exemplary embodiment of this application.
Figure 18:
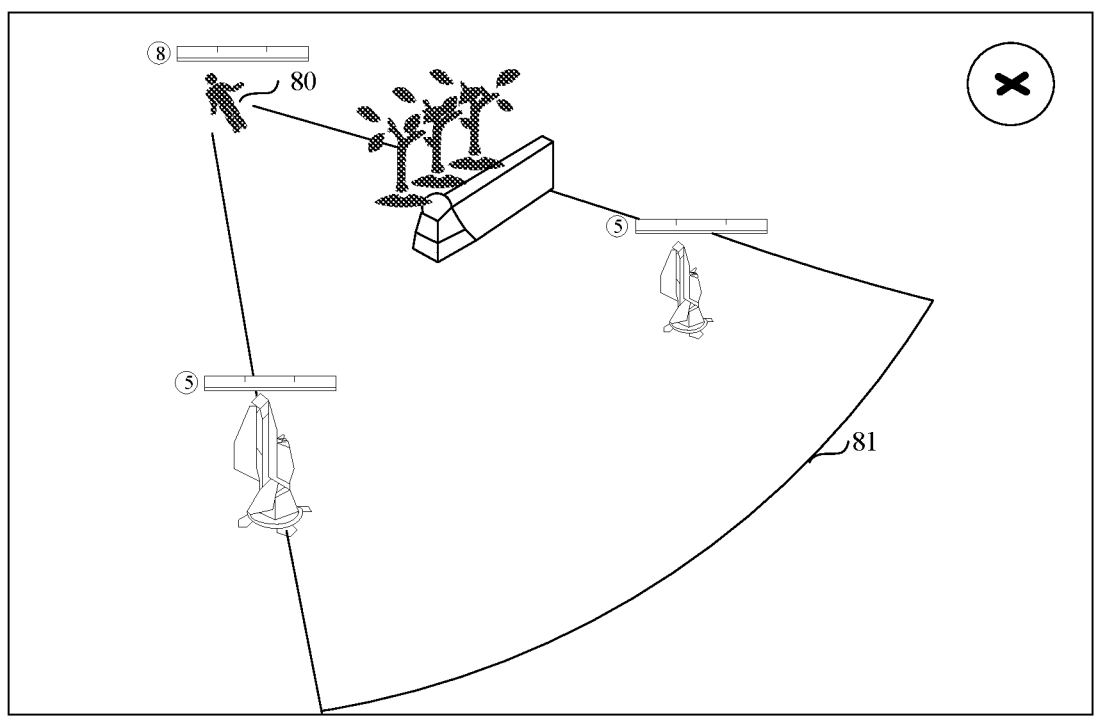
FIG. 18 is a schematic diagram of a second virtual environment picture according to an exemplary embodiment of this application.

A framework of the skill offset is shown in FIG. 17. The skill offset is an offset generated by the camera model when a master virtual character releases a skill. The skill offset includes at least one of the first offset and the second offset involved in the foregoing embodiments, and further includes another offset. The another offset is an offset of the camera model determined according to a type of a skill released by the master virtual character. As shown in FIG. 18, when a master virtual character 80 releases a skill, an action range of the skill is fan-shaped. Therefore, the camera model is offset to a lower right corner of the virtual environment picture according to the action range, so that the skill indicator is displayed completely in the virtual environment picture.

In some embodiments, a final offset of the camera model includes at least one of the global offset, the skill offset, and a lens height.

After the offset is obtained, the camera model needs to be moved according to the offset. In some embodiments, the movement manner of the camera model is obtained according to an offset manner. The movement manner includes at least one of a uniform motion, a smooth damping motion, and a difference motion. The camera model is controlled to move from a first camera position to a second camera position according to a movement manner.

The uniform motion is to control the camera model to move from the first camera position to the second camera position at a uniform speed within a configured time. This motion manner lacks a rhythmic change.

The smooth damping motion is a motion obtained by calling a function with a damping function, for example, a movement of the camera model controlled by using a function Vector3.SmoothDamp( ), so that the camera model does not generate an overshoot in a moving process.

The difference motion is a motion performed according to a position of the camera model, a target position, and a difference ratio. The camera model is controlled to move by using a function Vector3.Lerp(s, e, t), where s is a current offset value, and t changes from 0 to 1. The camera model moves until t changes to 1.

In an example, a distance between a current position and a target position is 10, and a difference ratio is 0.1. Each frame moves by a difference ratio of the distance from the current position to the target position. For example, the first frame moves by the difference ratio 0.1 of the distance from the current position 0 to the target position 10, that is, moves to a current position 1; the second frame moves by the difference ratio 0.1 of the distance from the current position 1 to the target position 10, that is, moves to current position 1.9; and the third frame moves by the difference ratio 0.1 of the distance from the current position 1.9 to the target position 10, that is, moves to a current position 2.71, and so on.

In another example, a minimum speed of a movement is set. If a current moving speed is less than the minimum speed, an offset is performed at the minimum speed.

In another example, a difference ratio increment a is set, and a difference ratio of each frame is changed through the difference ratio increment a. For example, if a distance between a current position and a target position is 10, a difference ratio is 0.2, and a ratio increment is 0.03, the first frame moves by the difference ratio 0.2 of the distance from the current position 0 to the target position 10, that is, moves to a current position 2; and the second frame moves by 0.23 of the distance from the current position 2 to the target position 10, that is, moves to a current position 3.84, and so on.

Figure 19:
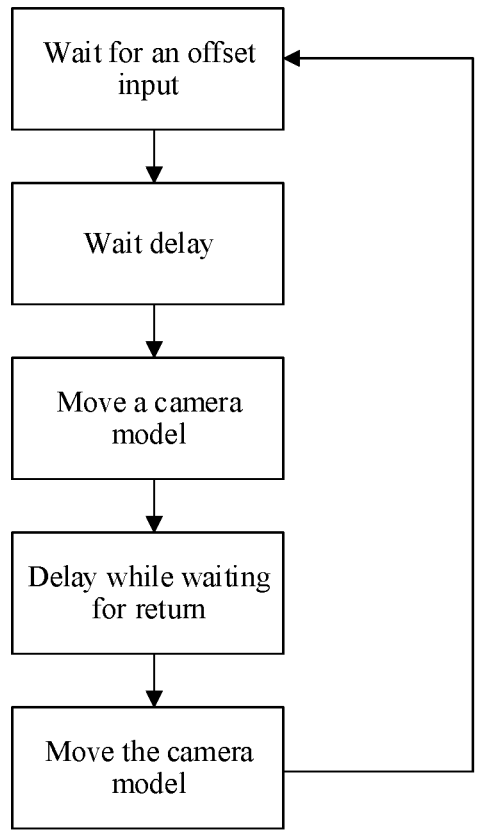
FIG. 19 is a flowchart framework diagram of controlling a camera model to move according to an exemplary embodiment of this application.

As shown in FIG. 19, an offset process of the camera model is classified into three states:
  waiting for an offset input (IDLE): there is an offset of the camera model or an offset has been completed;
  waiting delay (FAR): an offset generated when the user drags the regional skill indicator; and
  delay while waiting for return (BACK): the camera model returns to an origin after the master virtual character releases a regional skill.

Movement solutions may be specified for both Far and Back, which respectively represents skill releasing and return of the camera model. That is, two solutions may be used for a skill releasing.

In addition, a delay time (DelayTime) may be further configured, so that when the state of the camera model is changed from IDLE to FAR or from BACK to IDLE, the camera model is not immediately offset, and a buffering effect is generated visually.

Based on the above, a total offset of the camera model is calculated based on the sum of the global offset and the skill offset. When the user slides a map to change a virtual environment picture captured by the camera model and uses the regional skill indicator that is beyond the virtual environment picture, the camera model determines the total offset of the camera model with reference to the foregoing two offsets, so that offset effects of the camera model generated by different operations do not conflict, thereby reducing the calculation difficulty.

The foregoing method is described based on a game application scenario in the foregoing embodiments, and the following is an exemplary description of the foregoing method based on a military simulation application scenario.

The simulation technology is a model technology in which a system behavior or process is reflected by using software and hardware through an experiment of simulating a real world.

A military simulation program is a program specially constructed for military application by using the simulation technology, which performs quantitative analysis on battle elements such as sea, air, and land, weapon equipment performance, battle actions, and the like, to accurately simulate a battlefield environment, and present a battlefield situation, thereby implementing battle system evaluation and decision aids.

In an example, soldiers establish a virtual battlefield on a terminal on which the military simulation program is located, and fight in teams. The soldier controls a master virtual character in a virtual battlefield environment to perform at least one operation of standing, squatting, sitting down, lying on the back, lying prone, lying on the side, walking, running, climbing, driving, shooting, throwing, attacking, being injured, detecting, close combat and other actions in the virtual battlefield environment. The virtual battlefield environment includes at least one of the following nature forms: a plain, a mountain, a plateau, a basin, a desert, a river, a lake, a sea, vegetation, and site forms of a building, a vehicle, ruins, a training ground, and the like. The master virtual character includes a virtual person character, a virtual animal character, a cartoon person character, or the like. Each master virtual character has a shape and size in a 3D virtual environment, and occupies some space in the 3D virtual environment.

Based on the foregoing situation, in an example, there are master virtual characters controlled by two groups of soldiers in a virtual environment for a battle. Schematically, there is a master virtual character a controlled by a soldier A in the first team, and a master virtual character b controlled by a soldier B in the second team. A camera model is provided in the virtual environment, and the camera model captures virtual environment pictures that can be seen by the soldiers.

The virtual environment in which the master virtual character a is located corresponds to a first virtual environment picture. The first virtual environment picture is a virtual environment picture with a first observation position as an observation center. The camera model corresponding to the first observation position is located at a first camera position. The soldier A controls the master virtual character a to attack the master virtual character b controlled by the soldier B, and the master virtual character b is not in the first virtual environment picture. The soldier A performs an aiming operation of releasing a regional skill, and controls the master virtual character a to select a region in which the virtual character b is located in the virtual environment to place a regional skill indicator.

Schematically, the camera model is offset in a first offset manner with an operation of the soldier A. A visual field determining box invisible to the soldier A is provided in the virtual environment. The visual field determining box is a rectangle with an observation center of the camera model as a center point and parallel to a horizontal plane. At least one frame of the visual field determining box is perpendicular to an observation direction of the camera model. A region reference point is set at the center of the regional skill indicator. Schematically, the regional skill indicator is a circle, and the region reference point is the center of the regional skill indicator. When the center of the regional skill indicator is outside the visual field determining box, a distance between the region reference point and a frame of the visual field determining box is calculated. The distance is an offset of the camera model, which includes at least one of a first transverse offset distance and a first longitudinal offset distance.

The camera model switches from the first camera position to a second camera position according to an offset distance. The second camera position corresponds to a second observation position, and a second virtual environment picture is displayed by using the second observation position as an observation center. The soldier A can see a target region selected by the regional skill indicator in the second virtual environment picture, thereby releasing the regional skill indicator to attack the master virtual character b.

Schematically, the camera model is offset in a second offset manner with an operation of the soldier A. A selection region is displayed in the virtual environment, and the selection region is a range for the regional skill indicator to select the target region. The master virtual character a releases a regional skill with a larger action range to the master virtual character b by using the regional skill indicator. Schematically, the regional skill indicator is a circle, and the region reference point is the center of the regional skill indicator. The selection region is also a circle.

The camera model determines an indication direction of the regional skill indicator and an angle between the indication direction and a horizontal direction according to the operation of the soldier A, and determines a corresponding fixed offset distance of the camera model in an offset direction according to the indication direction. The fixed offset distance includes at least one of a second transverse offset distance and a second longitudinal offset distance. The offset of the camera model is calculated according to the offset direction, the fixed offset distance, and the offset ratio. The offset of the camera model includes at least one of a transverse offset and a longitudinal offset.

The transverse offset is a product of a cosine value of the angle between the indication direction and the horizontal direction, the second transverse offset distance, and the offset ratio. The formula is as follows:

Transverse offset=cos $\alpha$*second transverse offset distance*$(E/F)$ where a is an angle between the offset direction and the horizontal direction, E is a distance between the master virtual character and the region reference point, F is a radius of the selection region, and E/F is the offset ratio.

The longitudinal offset is a product of a sine value of the angle between the offset direction and the horizontal direction, the second longitudinal offset distance, and the offset ratio. The formula is as follows:

Longitudinal offset=sin $\alpha$*second longitudinal offset distance*$(E/F)$ where a is an angle between the offset direction and the horizontal direction, E is a distance between the master virtual character and the region reference point, F is a radius of the selection region, and E/F is the offset ratio.

The camera model switches from the first camera position to the second camera position according to the offset. The second camera position corresponds to the second observation position, and the second virtual environment picture is displayed by using the second observation position as an observation center. The soldier A can see the target region selected by the regional skill indicator in the second virtual environment picture, thereby accurately aiming at the master virtual character b to be attacked.

Based on the above, in this embodiment, the foregoing method for displaying a virtual environment picture is applied to a military simulation program. A camera model is offset according to a target region selected by a regional skill indicator, so that a soldier can see an aiming region, thereby improving the aiming accuracy of the soldier, carrying out a more realistic simulation of an actual combat scene, and providing better training for the soldier.

The following is an apparatus embodiment of this application. For details not described in detail in the apparatus embodiment, reference may be made to corresponding record in the foregoing method embodiments. Details are not described herein again.

Figure 20:
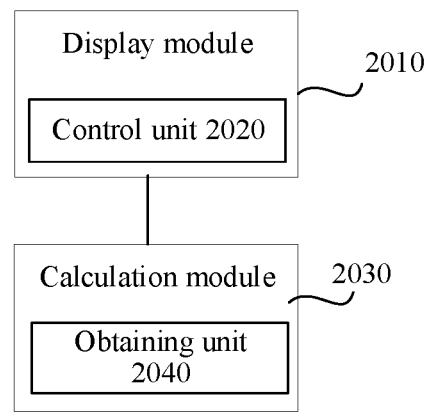
FIG. 20 is a framework diagram of an apparatus for displaying a virtual environment picture according to an exemplary embodiment of this application.

FIG. 20 is a schematic structural diagram of an apparatus for displaying a virtual environment picture according to an exemplary embodiment of this application. The apparatus may be implemented as an entire terminal or a part of a terminal by using software, hardware, or a combination thereof. The apparatus includes:

a display module 2010, configured to display a first virtual environment picture, the first virtual environment picture including a first region obtained by observing a virtual environment by using a first observation position as an observation center, the first virtual environment picture displaying a master virtual character located in the virtual environment, the display module 2010 being configured to display, in response to receiving an aiming operation, a regional skill indicator configured to select a target region, the regional skill indicator being configured to identify the target region in the virtual environment, the target region being a skill action region where the master virtual character releases a skill;

the display module 2010 being configured to display a second virtual environment picture, the second virtual environment picture including a second region obtained by observing the virtual environment by using a second observation position as an observation center, the second observation position being a position that is offset relative to the first observation position, and the second region including the target region.

In an embodiment, the virtual environment is provided with a camera model, the camera model is configured to observe the virtual environment to obtain the virtual environment picture, and the display module 2010 includes a control unit 2020.

The control unit 2020 is configured to move the camera model from a first camera position to a second camera position according to an offset manner, the first camera position being corresponding to the first observation position, and the second camera position being corresponding to the second observation position; and display the second virtual environment picture according to the second camera position at which the camera model is located.

In an embodiment, the offset manner includes a first offset manner, the first offset manner is a manner in which the camera model is offset based on a visual field determining box, the visual field determining box is configured to indicate a visual field range of the camera model, and the apparatus includes a calculation module 2030.

The calculation module 2030 is configured to determine, in response to that a region reference point is located outside the visual field determining box, a first offset of the camera model in the first offset manner according to a distance between the region reference point and a frame of the visual field determining box, the region reference point being determined based on a center point of the target region. The control unit 2020 is configured to move the camera model from the first camera position to the second camera position according to the first offset.

In an embodiment, the calculation module 2030 is configured to calculate a vertical distance between the region reference point and the frame of the visual field determining box in response to that the region reference point is located outside the visual field determining box, the vertical distance including at least one of a transverse vertical distance and a longitudinal vertical distance, the transverse vertical distance being a vertical distance between the region reference point and a longitudinal frame of the visual field determining box, and the longitudinal vertical distance being a vertical distance between the region reference point and a transverse frame of the visual field determining box. The control unit 2020 is configured to determine the vertical distance as the first offset of the camera model in the first offset manner.

In an embodiment, the control unit 2020 is configured to move the camera model from the second camera position to a third camera position in response to that the region reference point is relocated in the visual field determining box, the third camera position being located between the second camera position and the first camera position, the third camera position being corresponding to a third observation position. The display module 2010 is configured to display a third virtual environment picture according to the camera model located at the third camera position, the third virtual environment picture including a third region obtained by observing the virtual environment by using the third observation position as an observation center, the third region including the target region.

In an embodiment, the offset manner includes a second offset manner, the second offset manner is a manner of offsetting based on an indication direction, the indication direction is a direction pointing from a position at which the master virtual character is located to a center point of the target region, and the apparatus further includes a calculation module 2030.

The calculation module 2030 is configured to determine a second offset of the camera model in the second offset manner according to the indication direction.

The control unit 2020 is configured to move the camera model from the first camera position to the second camera position according to the second offset.

In an embodiment, the calculation module 2030 includes an obtaining unit 2040.

The obtaining unit 2040 is configured to obtain an angle between the indication direction and a horizontal direction, the horizontal direction being parallel to a horizontal plane in the virtual environment and perpendicular to an observation direction of the camera model; obtain a fixed offset distance of the camera model corresponding to the indication direction; and obtain an offset ratio of the camera model in the second offset manner, the offset ratio being used for instructing the camera model to move according to the ratio. The calculation module 2030 is configured to determine the second offset according to the angle, the fixed offset distance, and the offset ratio.

In an embodiment, the second offset includes a transverse offset, and the fixed offset distance includes a transverse offset distance.

The calculation module 2030 is configured to determine the transverse offset according to a product of a cosine value of the angle, the transverse offset distance, and the offset ratio, the offset ratio being a ratio of a first distance to a second distance, the first distance being a distance between the position at which the master virtual character is located and the center point of the target region, the second distance being a radius of a selection region, the selection region being used for providing a selection range for the regional skill indicator to select the target region.

In an embodiment, the second offset includes a longitudinal offset, and the fixed offset distance includes a longitudinal offset distance.

The calculation module 2030 is configured to determine the longitudinal offset according to a product of a sine value of the angle, the longitudinal offset distance, and the offset ratio, the offset ratio being a ratio of a first distance to a second distance, the first distance being a distance between the position at which the master virtual character is located and the center point of the target region, the second distance being a radius of a selection region, the selection region being used for providing a selection range for the regional skill indicator to select the target region.

In an embodiment, the control unit 2020 is configured to obtain a movement manner of the camera model according to the offset manner, the movement manner including any one of a uniform motion, a difference motion, and a smooth damping motion; and control the camera model to move from the first camera position to the second camera position according to the movement manner.

In an embodiment, the offset manner corresponds to an offset of the camera model.

The obtaining unit 2040 is configured to obtain a skill offset and a global offset of the camera model, the skill offset being determined according to an offset manner, the global offset being determined according to a control instruction of the camera model, the control instruction including at least one of an instruction of dragging a map, an instruction of viewing a minimap, and an instruction of specifying a virtual-unit perspective; and determine a sum of the skill offset and the global offset as the offset of the camera model.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 21:
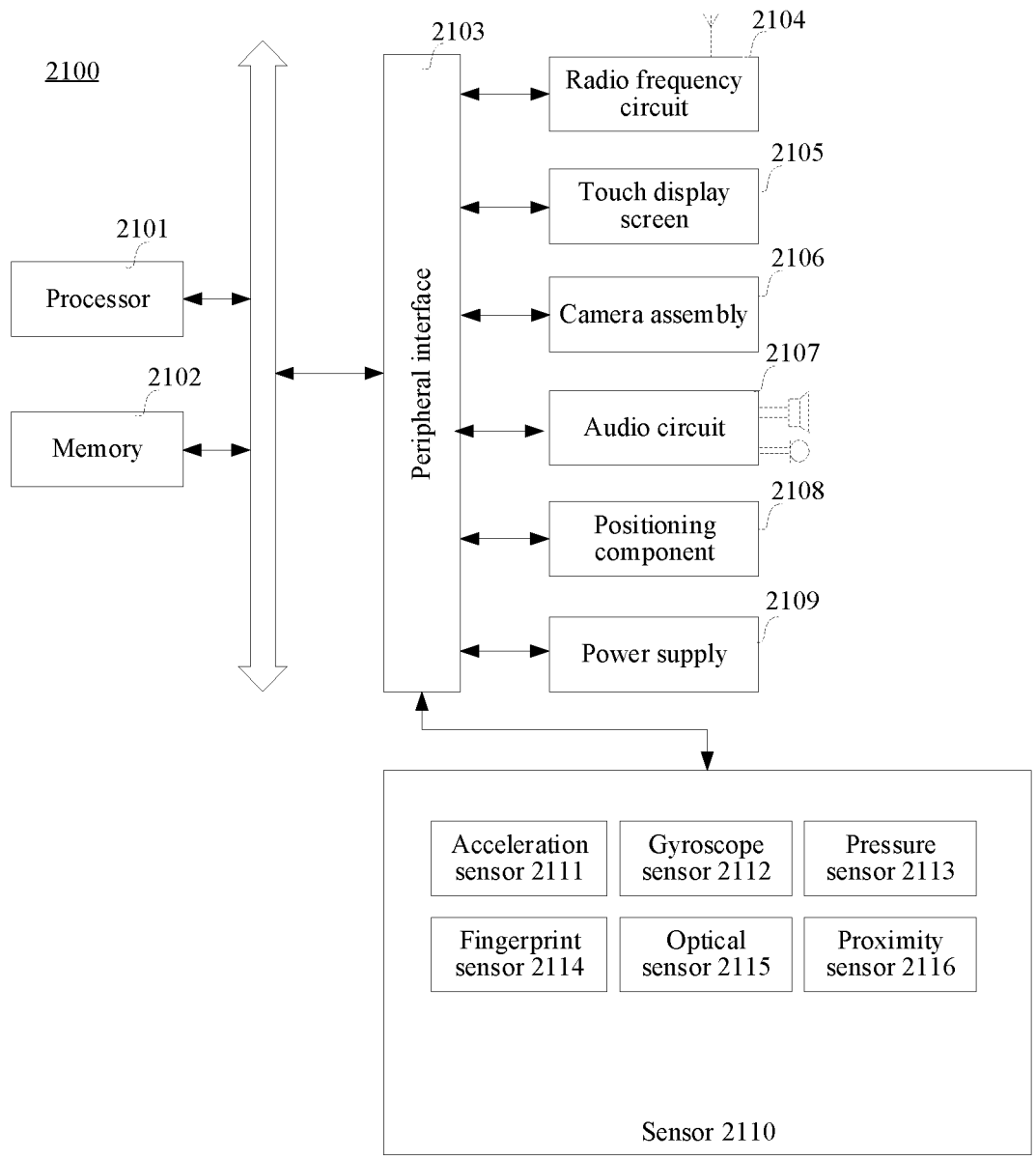
FIG. 21 is a schematic structural diagram of a computer device according to an exemplary embodiment of this application.

FIG. 21 is a structural block diagram of a computer device 2100 according to an exemplary embodiment of this application. The computer device 2100 may be a portable mobile terminal, for example, a smartphone, a tablet computer, an MP3 player, or an MP4 player. The computer device 2100 may be further referred to as other names such as user equipment or portable terminal.

Generally, the computer device 2100 includes a processor 2101 and a memory 2102.

The processor 2101 may include one or more processing cores, and may be, for example, a 4-core processor or an 8-core processor. The processor 2101 may be implemented in at least one hardware form of a digital signal processor (DSP), a field-programmable gate array (FPGA), and a programmable logic array (PLA). The processor 2101 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 2101 may be integrated with a graphics processing unit (GPU). The GPU is responsible for rendering and drawing content to be displayed by a display screen. In some embodiments, the processor 2101 may further include an artificial intelligence (AI) processor. The AI processor is configured to process a calculation operation related to machine learning.

The memory 2102 may include one or more non-transitory computer-readable storage media. The computer-readable storage medium may be tangible and non-transient. The memory 2102 may further include a high-speed random access memory (RAM), and a non-volatile memory such as one or more magnetic disk storage devices and a flash storage device. In some embodiments, the non-transient computer-readable storage medium in the memory 2102 is configured to store at least one instruction, and the at least one instruction is configured to be executed by the processor 2101 to implement the method for displaying a virtual environment picture provided in the embodiments of this application.

In some embodiments, the computer device 2100 further optionally includes a peripheral interface 2103 and at least one peripheral. Specifically, the peripheral includes: at least one of a radio frequency (RF) circuit 2104, a touch display screen 2105, a camera assembly 2106, an audio circuit 2107, a positioning component 2108, and a power supply 2109.

The peripheral interface 2103 may be configured to connect at least one peripheral related to input/output (I/O) to the processor 2101 and the memory 2102. In some embodiments, the processor 2101, the memory 2102, and the peripheral interface 2103 are integrated on the same chip or circuit board. In some other embodiments, any one or two of the processor 2101, the memory 2102, and the peripheral interface 2103 may be implemented on a separate chip or circuit board. This is not limited in this embodiment.

The RF circuit 2104 is configured to receive and transmit an RF signal, also referred to as an electromagnetic signal. The RF circuit 2104 communicates with a communication network and another communication device by using the electromagnetic signal. The RF circuit 2104 converts an electric signal into an electromagnetic signal for transmission, or converts a received electromagnetic signal into an electric signal. Optionally, the RF circuit 2104 includes an antenna system, an RF transceiver, one or more amplifiers, a tuner, an oscillator, a DSP, a codec chip set, a subscriber identity module card, and the like. The RF circuit 2104 may communicate with other terminals by using at least one wireless communication protocol. The wireless communication protocol includes, but is not limited to, a world wide web, a metropolitan area network, an intranet, generations of mobile communication networks (2G, 3G, 4G, and 5G), a wireless local area network and/or a wireless fidelity (Wi-Fi) network. In some embodiments, the RF 2104 may further include a circuit related to Near-Field Communication (NFC), which is not limited in this application.

The touch display screen 2105 is configured to display a UI. The UI may include a graph, text, an icon, a video, and any combination thereof. The touch display screen 2105 also has a capability of collecting a touch signal on or above a surface of the touch display screen 2105. The touch signal may be inputted, as a control signal, to the processor 2101 for processing. The touch display screen 2105 is configured to provide a virtual button and/or a virtual keyboard, which is also referred to as a soft button and/or a soft keyboard. In some embodiments, there is one touch display screen 2105, disposed on a front panel of the computer device 2100. In some other embodiments, there may be at least two touch display screens 2105, respectively disposed on different surfaces of the computer device 2100 or designed in a foldable shape. In still some other embodiments, the touch display screen 2105 may be a flexible display screen, disposed on a curved surface or a folded surface of the computer device 2100. Even, the touch display screen 2105 may be further set in a non-rectangular irregular pattern, namely, a special-shaped screen. The touch display screen 2105 may be made of a material such as a liquid crystal display (LCD) or an organic light-emitting diode (OLED).

In some embodiments, the computer device 2100 further includes one or more sensors 2110. The one or more sensors 2110 include, but are not limited to, an acceleration sensor 2111, a gyroscope sensor 2112, a pressure sensor 2113, a fingerprint sensor 2114, an optical sensor 2115, and a proximity sensor 2116.

The pressure sensor 2113 may be disposed on a side frame of the computer device 2100 and/or a lower layer of the touch display screen 2105. When the pressure sensor 2113 is disposed at the side frame of the computer device 2100, a holding signal of the user on the computer device 2100 may be detected, and left/right hand identification and a quick operation may be performed according to the holding signal. When the pressure sensor 2113 is disposed at the lower layer of the touch display screen 2105, an operable control on the UI interface can be controlled according to a pressure operation of the user on the touch display screen 2105. The operable control includes at least one of a button control, a scroll-bar control, an icon control, and a menu control.

A person skilled in the art may understand that the structure shown in FIG. 21 does not constitute any limitation on the computer device 2100, and the computer device may include more components or fewer components than those shown in the figure, or some components may be combined, or a different component deployment may be used.

An embodiment of this application further provides a computer device including a processor and a memory, the memory storing at least one instruction, at least one program, a code set or an instruction set, the at least one instruction, the at least one program, the code set or the instruction set being loaded and executed by the processor to implement method for displaying a virtual environment picture provided in the foregoing method embodiments.

An embodiment of this application further provides a computer-readable storage medium, storing at least one instruction, at least one program, a code set or an instruction set, the at least one instruction, the at least one program, the code set or the instruction set being loaded and executed by a processor to implement the method for displaying a virtual environment picture provided in the foregoing method embodiments.

This application provides a computer program product or a computer program, the computer program product or the computer program including computer instructions, the computer instructions being stored in a computer-readable storage medium. A processor of the computer device reads the computer instructions from the computer-readable storage medium. The processor executes the computer instructions, causing the computer device to perform the method for displaying a virtual environment picture described in the foregoing aspects.

What is claimed is:

1. A method for operating virtual characters within a virtual environment performed by a computer device, the method comprising:
displaying a first virtual environment picture of a virtual environment by observing the virtual environment using a camera model at a first observation position, the first virtual environment picture comprising a first region including a master virtual character located in the virtual environment;
in response to receiving an aiming operation associated with the main master virtual character, determining a target region in the virtual environment where the master virtual character aims for releasing a skill; and
in accordance with a determination that at least a portion of the target region is not within the first region:
moving the camera model from the first observation position to a second observation position by an offset manner; and
displaying a second virtual environment picture by observing the virtual environment using the camera model at the second first observation position, the second virtual environment picture comprising a second region such that the target region is within the second region.

2. The method according to claim 1, wherein the target region is surrounded by a regional skill indicator in the second virtual environment picture indicating a skill action region by the skill after released by the master virtual character.

3. The method according to claim 2, wherein the target region is not within the first region when a center point of the regional skill indicator is outside a visual field determining box associated with the first region.

4. The method according to claim 2, wherein the target region is within the first region when a center point of the regional skill indicator is within a visual field determining box associated with the second region.

5. The method according to claim 2, wherein the method further comprises:
after the master virtual character releases the skill toward the target region,
removing the regional skill indicator from the target region;
moving the virtual camera from the second observation position back to the first observation position; and
displaying a third virtual environment picture by observing the virtual environment using the camera model at the first observation position, the third virtual environment picture comprising the first region and a portion of the target region.

6. The method according to claim 1, wherein the offset manner comprises a first offset manner, the first offset manner is a manner in which the camera model is offsetting based on a visual field determining box, and the visual field determining box is configured to indicate a visual field range of the camera model; and
the moving the camera model from the first observation position to a second observation position according to an offset manner comprises:
determining, in response to that a region reference point is located outside the visual field determining box, a first offset of the camera model in the first offset manner according to a distance between the region reference point and a frame of the visual field determining box, the region reference point being determined based on a center point of the target region; and
moving the camera model from the first camera position to the second camera position according to the first offset.

7. The method according to claim 6, wherein the determining, in response to that a region reference point is located outside the visual field determining box, a first offset of the camera model in the first offset manner according to a distance between the region reference point and a frame of the visual field determining box comprises:
calculating a vertical distance between the region reference point and the frame of the visual field determining box in response to that the region reference point is located outside the visual field determining box, the vertical distance comprising at least one of a transverse vertical distance and a longitudinal vertical distance, the transverse vertical distance being a vertical distance between the region reference point and a longitudinal frame of the visual field determining box, and the longitudinal vertical distance being a vertical distance between the region reference point and a transverse frame of the visual field determining box; and
determining the vertical distance as the first offset of the camera model in the first offset manner.

8. The method according to claim 1, wherein the offset manner comprises a second offset manner, the second offset manner is a manner of offsetting based on an indication direction, and the indication direction is a direction pointing from a position at which the master virtual character is located to a center point of the target region; and
the moving the camera model from the first observation position to a second observation position according to an offset manner comprises:
determining a second offset of the camera model in the second offset manner according to the indication direction; and
moving the camera model from the first observation position to the second observation position according to the second offset.

9. The method according to claim 8, wherein the determining a second offset of the camera model in the second offset manner according to the indication direction comprises:
obtaining an angle between the indication direction and a horizontal direction, the horizontal direction being parallel to a horizontal plane in the virtual environment and perpendicular to an observation direction of the camera model;
obtaining a fixed offset distance of the camera model corresponding to the indication direction;
obtaining an offset ratio of the camera model in the second offset manner, the offset ratio being used for instructing the camera model to move according to the ratio; and
determining the second offset according to the angle, the fixed offset distance, and the offset ratio.

10. A computer device comprising a processor and a memory, the memory storing at least one program, the program being loaded and executed by the processor to perform a method for operating virtual characters within a virtual environment including:
displaying a first virtual environment picture of a virtual environment by observing the virtual environment using a camera model at a first observation position, the first virtual environment picture comprising a first region including a master virtual character located in the virtual environment;
in response to receiving an aiming operation associated with the main master virtual character, determining a target region in the virtual environment where the master virtual character aims for releasing a skill; and in accordance with a determination that at least a portion of the target region is not within the first region:
- moving the camera model from the first observation position to a second observation position by an offset manner; and
- displaying a second virtual environment picture by observing the virtual environment using the camera model at the second first observation position, the second virtual environment picture comprising a second region such that the target region is within the second region.

11. The computer device according to claim 10, wherein the target region is surrounded by a regional skill indicator in the second virtual environment picture indicating a skill action region by the skill after released by the master virtual character.

12. The computer device according to claim 11, wherein the target region is not within the first region when a center point of the regional skill indicator is outside a visual field determining box associated with the first region.

13. The computer device according to claim 11, wherein the target region is within the first region when a center point of the regional skill indicator is within a visual field determining box associated with the second region.

14. The computer device according to claim 11, wherein the method further comprises:
- after the master virtual character releases the skill toward the target region,
- removing the regional skill indicator from the target region;
- moving the virtual camera from the second observation position back to the first observation position; and
- displaying a third virtual environment picture by observing the virtual environment using the camera model at the first first observation position, the third virtual environment picture comprising the first region and a portion of the target region.

15. The computer device according to claim 10, wherein the offset manner comprises a first offset manner, the first offset manner is a manner in which the camera model is offsetting based on a visual field determining box, and the visual field determining box is configured to indicate a visual field range of the camera model; and
- the moving the camera model from the first observation position to a second observation position according to an offset manner comprises:
- determining, in response to that a region reference point is located outside the visual field determining box, a first offset of the camera model in the first offset manner according to a distance between the region reference point and a frame of the visual field determining box, the region reference point being determined based on a center point of the target region; and
- moving the camera model from the first camera position to the second camera position according to the first offset.

16. The computer device according to claim 15, wherein the determining, in response to that a region reference point is located outside the visual field determining box, a first offset of the camera model in the first offset manner according to a distance between the region reference point and a frame of the visual field determining box comprises:
- calculating a vertical distance between the region reference point and the frame of the visual field determining box in response to that the region reference point is located outside the visual field determining box, the vertical distance comprising at least one of a transverse vertical distance and a longitudinal vertical distance, the transverse vertical distance being a vertical distance between the region reference point and a longitudinal frame of the visual field determining box, and the longitudinal vertical distance being a vertical distance between the region reference point and a transverse frame of the visual field determining box; and
- determining the vertical distance as the first offset of the camera model in the first offset manner.

17. The computer device according to claim 10, wherein the offset manner comprises a second offset manner, the second offset manner is a manner of offsetting based on an indication direction, and the indication direction is a direction pointing from a position at which the master virtual character is located to a center point of the target region; and
- the moving the camera model from the first observation position to a second observation position according to an offset manner comprises:
- determining a second offset of the camera model in the second offset manner according to the indication direction; and
- moving the camera model from the first observation position to the second observation position according to the second offset.

18. The computer device according to claim 17, wherein the determining a second offset of the camera model in the second offset manner according to the indication direction comprises:
- obtaining an angle between the indication direction and a horizontal direction, the horizontal direction being parallel to a horizontal plane in the virtual environment and perpendicular to an observation direction of the camera model;
- obtaining a fixed offset distance of the camera model corresponding to the indication direction;
- obtaining an offset ratio of the camera model in the second offset manner, the offset ratio being used for instructing the camera model to move according to the ratio; and
- determining the second offset according to the angle, the fixed offset distance, and the offset ratio.

19. A non-transitory computer-readable storage medium, storing at least one program, the at least one program being loaded and executed by a processor of a computer device to perform a method for operating virtual characters within a virtual environment including:
- displaying a first virtual environment picture of a virtual environment by observing the virtual environment using a camera model at a first observation position, the first virtual environment picture comprising a first region including a master virtual character located in the virtual environment;
- in response to receiving an aiming operation associated with the main master virtual character, determining a target region in the virtual environment where the master virtual character aims for releasing a skill; and
- in accordance with a determination that at least a portion of the target region is not within the first region:
- moving the camera model from the first observation position to a second observation position by an offset manner; and
- displaying a second virtual environment picture by observing the virtual environment using the camera model at the second first observation position, the second virtual environment picture comprising a second region such that the target region is within the second region.

20. The non-transitory computer-readable storage medium according to claim 19, wherein the target region is surrounded by a regional skill indicator in the second virtual environment picture indicating a skill action region by the skill after released by the master virtual character.

\* \* \* \* \*